(12) United States Patent
Hosotani et al.

(10) Patent No.: US 8,582,326 B2
(45) Date of Patent: Nov. 12, 2013

(54) SWITCHING POWER SUPPLY APPARATUS

(75) Inventors: Tatsuya Hosotani, Nagaokakyo (JP);
Takashi Hara, Nagaokakyo (JP)

(73) Assignee: Murata Manufacturing Co., Ltd.,
Kyoto (JP)

( * ) Notice: Subject to any disclaimer, the term of this patent is extended or adjusted under 35 U.S.C. 154(b) by 0 days.

(21) Appl. No.: 13/272,387

(22) Filed: Oct. 13, 2011

(65) Prior Publication Data
US 2012/0033454 A1    Feb. 9, 2012

Related U.S. Application Data

(63) Continuation of application No. PCT/JP2010/055339, filed on Mar. 26, 2010.

(30) Foreign Application Priority Data

Apr. 14, 2009    (JP) .................................. 2009-098182

(51) Int. Cl.
*H02M 3/335*    (2006.01)
(52) U.S. Cl.
USPC ...................................... 363/21.13; 363/21.05
(58) Field of Classification Search
USPC .......................... 363/20, 21.01, 21.04–21.13, 363/21.15–21.18, 22, 24
See application file for complete search history.

(56) References Cited

U.S. PATENT DOCUMENTS

| | | | |
|---|---|---|---|
| 4,947,309 A * | 8/1990 | Jonsson ........................... | 363/17 |
| 5,736,842 A * | 4/1998 | Jovanovic ..................... | 323/222 |
| 5,808,879 A * | 9/1998 | Liu et al. .......................... | 363/17 |
| 6,483,722 B2 | 11/2002 | Nozawa et al. | |
| 7,787,263 B2 * | 8/2010 | Oettinger et al. .......... | 363/21.05 |
| 2001/0031471 A1 | 10/2001 | Ishizuka et al. | |
| 2001/0036085 A1* | 11/2001 | Narita .............................. | 363/16 |

(Continued)

FOREIGN PATENT DOCUMENTS

| EP | 0 998 017 A2 | 5/2000 |
|---|---|---|
| JP | 04-076185 U | 7/1992 |

(Continued)

OTHER PUBLICATIONS

Hosotani et al., "Switching Power Supply Apparatus," U.S. Appl. No. 13/272,388, filed Oct. 13, 2011.

(Continued)

*Primary Examiner* — Adolf Berhane
*Assistant Examiner* — Jefferey Gblende
(74) *Attorney, Agent, or Firm* — Keating & Bennett, LLP

(57) ABSTRACT

A resonance-type power supply is provided in which no short circuit occurs and driving is performed with a constant switching period by performing switching control using a change of magnetic flux of a magnetic component as a trigger. When the change of magnetic flux of the transformer is detected, the first switching control signal is caused to transition to the Hi level. The detection voltage signal is A/D-converted, a first on-time is determined from the level thereof, and a second on-time is calculated by subtracting the first on-time from the constant switching period. When the first switching control signal is caused to transition to the Low level based on the first on-time, the change of magnetic flux of the transformer is detected, and the second switching control signal is caused to transition to the Hi level and is caused to transition to the Low level after the second on-time has elapsed.

18 Claims, 24 Drawing Sheets

(56) References Cited

U.S. PATENT DOCUMENTS

| | | |
|---|---|---|
| 2002/0067624 A1 | 6/2002 | Nishiyama et al. |
| 2002/0080634 A1 | 6/2002 | Nozawa et al. |
| 2003/0179592 A1* | 9/2003 | Nishiyama et al. ............ 363/20 |
| 2006/0181230 A1 | 8/2006 | Hosotani et al. |
| 2007/0076448 A1* | 4/2007 | Usui .......................... 363/21.01 |
| 2008/0252271 A1* | 10/2008 | Iwamura ....................... 323/271 |
| 2009/0196075 A1* | 8/2009 | Arduini ...................... 363/21.06 |

FOREIGN PATENT DOCUMENTS

| | | |
|---|---|---|
| JP | 05-252795 A | 9/1993 |
| JP | 2000-116147 A | 4/2000 |
| JP | 2001-037220 A | 2/2001 |
| JP | 2001-258269 A | 9/2001 |
| JP | 2002-369516 A | 12/2002 |
| JP | 2004-312913 A | 11/2004 |
| JP | 2005-184964 A | 7/2005 |
| WO | 2005/076447 A1 | 8/2005 |

OTHER PUBLICATIONS

Official Communication issued in International Patent Application No. PCT/JP2010/055339, mailed on Jun. 29, 2010.

Hosotani et al., "Switching Power Supply Apparatus,", U.S. Appl. No. 13/272,388, filed Oct. 13, 2011.

* cited by examiner

SWITCHING POWER SUPPLY APPARATUS

BACKGROUND OF THE INVENTION

1. Field of the Invention

The present invention relates to a switching power supply, such as a resonance-type power supply or a half-bridge-type power supply, for example, which outputs a predetermined voltage signal by causing a plurality of switching elements to be alternately turned on and off.

2. Description of the Related Art

In the past, various kinds of switching power supplies have been invented, each of which outputs a predetermined voltage signal by causing a plurality of switching elements to be alternately turned on and off. For example, in a switching power supply utilizing a PWM method of a half-bridge-type converter, a time ratio is adjusted at a constant switching frequency, thereby obtaining a desired output voltage signal. However, in such a switching power supply in which a plurality of switching elements are alternately turned on and off, if there is a time period when a plurality of switching elements are simultaneously turned on, a large short-circuit current flows, and there is a possibility of the power supply being destroyed. Therefore, a dead time is provided in which the plurality of the switching elements are turned off.

Since such a dead time is provided, a switching power supply disclosed in WO2005-076447 includes a first switching element and a second switching element that are alternately turned on and off, and a change of magnetic flux of a transformer due to the turning off of the first switching element is used as a trigger to turn on the second switching element. In addition, the change of magnetic flux of a transformer due to the turning off of the second switching element is used as a trigger to turn on the first switching element. By performing such switching control as described above, the first switching element and the second switching element are prevented from being simultaneously turned on.

However, in the switching power supply disclosed in WO2005-076447, since the on-time of the second switching element is determined by a time constant circuit including a resistor and a capacitor, a switching frequency varies and a switching noise occurs in a wide range in response to the variation of the switching frequency.

In addition, while the time constant circuit is designed taking into account the dead time, since a dead time having the same time length is set in a full load region, namely even in a transient state and a steady state, it is difficult to set an optimal dead time in the steady state in which a dead time that is as long as the dead time in the transient state is not necessary. Accordingly, the above-mentioned switching power supply is less than optimal in terms of efficiency but has a high degree of reliability.

SUMMARY OF THE INVENTION

To overcome the problems described above, preferred embodiments of the present invention provide a switching power supply in which a plurality of switching elements are prevented from being simultaneously turned on while a switching frequency is maintained constant, and switching is performed with an optimal dead time.

A preferred embodiment according to the present invention provides a switching power supply apparatus preferably including a direct-current power-supply input unit to which a direct-current input voltage is input, a transformer being defined by one magnetic component and including at least a first primary winding and a first secondary winding that are magnetically coupled to one another, an inductor connected in series to the first primary winding, a first switch circuit including a parallel circuit of a first switching element, a first capacitor, and a first diode, a second switch circuit including a parallel circuit of a second switching element, a second capacitor, and a second diode, a third capacitor, a first series circuit that is connected to both end portions of the direct-current power-supply input unit and in which the first primary winding and the first switch circuit are connected in series, and a second series circuit that is connected to both end portions of the first switch circuit or both end portions of the first primary winding and in which the second switch circuit and the third capacitor are connected in series, wherein the first switch circuit and the second switch circuit are configured so as to operate so that the first switch circuit and the second switch circuit complementarily repeat turn on and turn off with a time period (dead time) in between, during which both of the first switch circuit and the second switch circuit are turned off, and the switching power supply apparatus includes a power converter circuit arranged such that an output voltage is output to a secondary side through a first rectification smoothing circuit rectifying and smoothing an alternating-current voltage output from the first secondary winding. In addition, the switching power supply apparatus preferably includes a first monitor signal generator arranged to detect the change of a voltage or current based on an equivalent circuit of the power converter circuit, which occurs due to the turn off of a switch circuit in an on-state from among the first switch circuit and the second switch circuit, and to generate a monitor signal, and a digital control circuit arranged to control the first switching element and the second switching element. The digital control circuit sets on-times of the first switching element and the second switching element with a timing based on a clock signal, based on arithmetic processing, start timings of the on-times are determined on a timing based on the clock signal, at which the monitor signal is input as a trigger, and based on the trigger, a control signal used to turn on the first switching element and the second switching element is generated, and a stop timing of the on-time is determined with a timing based on the clock signal in accordance with the on-time set by the arithmetic processing, and based on the stop timing, a control signal used to turn off the first switching element or the second switching element is generated.

In this configuration, the on-times of the first and second switching elements are preferably determined by a digital IC using the arithmetic processing. At this time, individual on-times are determined with reference to the timing of a predetermined clock signal. Therefore, since the turn on of the switching element to be turned on is performed from a start timing including a predetermined delay amount set with the timing of the change of magnetic flux as a base point, the change of magnetic flux being due to the turn off of the switching element that has been in an on-state most recently, individual switching elements are not simultaneously turned on.

In addition, the switching power supply apparatus according to a preferred embodiment of the present invention preferably includes an output voltage detector arranged to detect the output voltage, and the on-time of one of the first switching element and the second switching element is determined based on a value detected by the output voltage detector.

This configuration specifically illustrates a method for determining the on-time of a specific switching element, and the corresponding on-time is set in response to the output voltage as the switching power supply. Accordingly, a stable output voltage is obtained as the switching power supply.

In addition, the on-time of the other one of the first switching element and the second switching element in the switching power supply apparatus is preferably determined by subtracting the on-time of one of the first switching element and the second switching element from a settable switching period.

In this configuration, when the on-time of the specific switching element is determined as described above, the on-time of the other switching element is determined by subtraction processing that can be simply and rapidly performed.

In addition, in the switching power supply apparatus according to a preferred embodiment of the present invention, a magnetic polarity of the first primary winding and the first secondary winding is preferably a reverse polarity with respect to a direction of a current flowing when the first switch circuit is in a conduction state or the second switch circuit is in a conduction state.

This configuration produces a switching power supply apparatus that is an isolated flyback converter. In addition, even using such a configuration, it is possible to provide switching control according to a preferred embodiment of the present invention.

In addition, in the switching power supply apparatus according to a preferred embodiment of the present invention, a magnetic polarity of the first primary winding and the first secondary winding is preferably the same polarity with respect to a direction of a current flowing when the first switch circuit is in a conduction state or the second switch circuit is in a conduction state.

This configuration produces a switching power supply apparatus that is an isolated forward converter. In addition, even using such a configuration, it is possible to provide switching control according to a preferred embodiment of the present invention.

In addition, in the switching power supply apparatus according to a preferred embodiment of the present invention, the transformer preferably further includes a second secondary winding, the first secondary winding and the second secondary winding are connected in series, and a magnetic polarity of the first primary winding and the first secondary winding and a magnetic polarity of the first primary winding and the second secondary winding are the same polarities with respect to a direction of a current flowing when the first switch circuit is in a conduction state or the second switch circuit is in a conduction state, and the first rectification smoothing circuit preferably includes a center tap-type full-wave rectifier circuit, at least one filter inductor, and at least one smoothing capacitor.

In this configuration, a center tap-method isolated switching power supply is achieved. In addition, even in the switching power supply having such a configuration, it is possible to provide the above-described switching control.

In addition, in the switching power supply apparatus according to a preferred embodiment of the present invention, the transformer preferably further includes a second secondary winding, the first secondary winding and the second secondary winding are connected in series, and a magnetic polarity of the first primary winding and the first secondary winding is the reverse polarity and a magnetic polarity of the first primary winding and the second secondary winding ns2 is the same polarity, with respect to a direction of a current flowing when the first switch circuit is in a conduction state or the second switch circuit is in a conduction state, and in the first rectification smoothing circuit, cathode sides of rectifying elements are connected to both end portions of the second secondary winding, respectively, anode sides of the rectifying elements are commonly connected, one end portion of at least one filter inductor is connected to the other end portion of the first secondary winding, and at least one smoothing capacitor is connected between the other end portion of the filter inductor and the anodes of the rectifying elements.

This configuration includes the first and second secondary windings, and the isolated switching power supply is provided in which electrical power transmission can be performed over substantially the entire time period. In addition, even in a switching power supply having such a configuration, it is possible to provide the above-described switching control and a more efficient switching power supply is obtained.

In addition, in the switching power supply apparatus according to a preferred embodiment of the present invention, a secondary-side leakage flux of the transformer is preferably provided as the filter inductor.

In this configuration, since an element of the switching power supply is omitted, the circuit configuration of a switching power supply including the features described above is simplified.

In addition, in the switching power supply apparatus according to a preferred embodiment of the present invention, a turn ratio between the first secondary winding and the second secondary winding is preferably about 1:2; for example.

In this configuration, in the isolated switching power supply in which electrical power transmission can be performed over substantially the entire time period, the output voltage is stable over substantially the entire time period and a ripple is improved.

In addition, in the switching power supply apparatus according to a preferred embodiment of the present invention, the transformer preferably further includes a second primary winding, one end portion of the second primary winding is connected on a low electrical potential side of the direct-current input power supply, and the other end portion thereof is supplied as a direct-current power-supply voltage used for the digital control circuit through a second rectification smoothing circuit.

In this configuration, by using a bias winding, it is possible to easily supply a driving power used for a control digital IC in a self-driven apparatus.

In addition, another preferred embodiment of the present invention provides a switching power supply apparatus preferably including a direct-current power-supply input unit to which a direct-current input voltage is input, an inductor defined by one magnetic component, a first switch circuit including a parallel circuit of a first switching element, a first capacitor, and a first diode, a second switch circuit including a parallel circuit of a second switching element, a second capacitor, and a second diode, a third capacitor, a first series circuit that is connected to both end portions of the direct-current power-supply input unit and in which the inductor and the first switch circuit are connected in series, and a second series circuit that is connected to both end portions of the first switch circuit or both end portions of the inductor and in which the second switch circuit and the third capacitor are connected in series, wherein the first switch circuit and the second switch circuit are configured to operate such that the first switch circuit and the second switch circuit complementarily repeat turn on and turn off with a time period in between, for which both of the first switch circuit and the second switch circuit are turned off, and the switching power supply apparatus is preferably arranged so that an output voltage is output through a first rectification smoothing circuit including a rectifying element whose anode is connected to a connection point between the inductor and the first switch circuit and a fourth capacitor including one end portion that is connected to a cathode of the rectifying element and that is connected in parallel to the inductor. The switching power supply apparatus preferably includes a first monitor signal generator arranged to detect the change of a voltage or current based on an equivalent circuit of the power converter circuit, which occurs due to the turn off of a switch circuit in an on-state from among the first switch circuit and the second switch circuit, and to generate a monitor signal, and a digital control circuit arranged to control the first switching element and the second switching element, wherein the digital control circuit sets on-times of the first switching element and the second switching element with a timing based on a clock signal, using arithmetic processing, start timings of the on-times are determined with a timing based on the clock signal, at which the monitor signal is input as a trigger, and based on the trigger, a control signal used to turn on the first switching element or the second switching element is generated, and a stop timing of the on-time is determined with a timing based on the clock signal in accordance with the on-time set by the arithmetic processing, and based on the stop timing, a control signal used to turn off the first switching element or the second switching element is generated.

This configuration produces a switching power supply apparatus that is a non-isolated buck-boost converter including a polarity-reversed chopper circuit. In addition, even in such a non-isolated switching power supply, it is possible to provide the above-described switching control.

In addition, in the switching power supply apparatus according to a preferred embodiment of the present invention, the rectifying element of the first rectification smoothing circuit is preferably a field-effect transistor, for example.

This configuration illustrates an example in which a FET is preferably used as the rectifying element of the rectification smoothing circuit. In addition, even in such a switching power supply apparatus, it is possible to provide the above-described switching control.

In addition, in the switching power supply apparatus according to a preferred embodiment of the present invention, the rectifying element of the first rectification smoothing circuit is preferably subjected to on-off control by a digital control circuit.

This configuration illustrates an example in which a FET is preferably used as the rectifying element of the rectification smoothing circuit and an example in which the corresponding FFT is controlled along with the first and second switching elements. In addition, even in such a switching power supply apparatus, it is possible to provide the above-described switching control.

In addition, another preferred embodiment of the present invention provides a non-isolated switching power supply apparatus preferably including a direct-current power-supply input unit to which a direct-current input voltage is input, an inductor defined by one magnetic component, a first switch circuit including a parallel circuit of a first switching element, a first capacitor, and a first diode, and a second switch circuit including a parallel circuit of a second switching element, a second capacitor, and a second diode, wherein a series circuit including the first switch circuit and the second switch circuit is connected to both end portions of the direct-current power-supply input unit, the switching power supply apparatus is preferably arranged such that one end portion of the inductor is connected to a connection point between the first switch circuit and the second switch circuit and, from the other end portion thereof, an output voltage is output through a third capacitor connected in parallel to the first switch circuit. In this switching power supply apparatus, the first switch circuit and the second switch circuit are preferably arranged to operate such that the first switch circuit and the second switch circuit complementarily repeat turn on and turn off with a time period in between, for which both the first switch circuit and the second switch circuit are turned off, and the switching power supply apparatus preferably includes a first monitor signal generator arranged to detect the change of a voltage or current based on an equivalent circuit of a power converter circuit, which occurs due to the turn off of a switch circuit in an on-state from among the first switch circuit and the second switch circuit, and to generate a monitor signal. The switching power supply apparatus preferably includes a digital control circuit arranged to control the first switching element and the second switching element, wherein the digital control circuit sets on-times of the first switching element and the second switching element with a timing based on a clock signal, using arithmetic processing, start timings of the on-times are determined with a timing based on the clock signal, at which the monitor signal is input as a trigger, and based on the trigger, a control signal used to turn on the first switching element or the second switching element is generated, and a stop timing of the on-time is determined with a timing based on the clock signal in accordance with the on-time set by the arithmetic processing, and based on the stop timing, a control signal used to turn off the first switching element or the second switching element is generated.

This configuration produces a switching power supply apparatus that is a half-bridge-type non-isolated buck converter. In addition, even in such a non-isolated switching power supply apparatus, it is possible to provide the above-described switching control.

In addition, the switching power supply apparatus according to a preferred embodiment of the present invention preferably includes an output voltage detector arranged to detect the output voltage, and the on-time of one of the first switching element and the second switching element is determined based on a value detected by the output voltage detector.

This configuration specifically illustrates a method for determining the on-time of a specific switching element in a non-isolated switching power supply apparatus, and the corresponding on-time is set in response to the output voltage as the switching power supply. Accordingly, it is possible to obtain a stable output voltage as the switching power supply.

In addition, in the switching power supply apparatus according to a preferred embodiment of the present invention, the on-time of the other of the first switching element and the second switching element is determined by subtracting the on-time of one of the first switching element and the second switching element from a settable switching period.

In this configuration, when the on-time of the specific switching element is determined, the on-time of the other switching element is determined by subtraction processing that can be simply and rapidly processed.

In addition, in the switching power supply apparatus according to a preferred embodiment of the present invention, the first switch circuit or the second switch circuit is preferably a field-effect transistor, for example.

In this configuration, the first and second switch circuits are preferably FETs, for example. In addition, even in such a switching power supply apparatus, it is possible to provide the above-described switching control. Furthermore, it is possible to perform a high-speed switching operation using FETs.

In addition, in the switching power supply apparatus according to a preferred embodiment of the present invention, the first switch circuit or the second switch circuit is preferably driven by a zero voltage switching operation in which, after voltages of both end portions of the switch circuit have been decreased to 0 V or the vicinity of 0 V, the switching element is turned on.

In this configuration, a zero-voltage switching (ZVS) is realized. Accordingly, it is possible to efficiently suppress a loss occurring at the time of the turn on of the switching element.

In addition, in the switching power supply apparatus according to a preferred embodiment of the present invention, the first monitor signal generator preferably is a current transformer used to detect a current flowing through the inductor Lr.

In addition, in the switching power supply apparatus according to a preferred embodiment of the present invention, the first monitor signal generator preferably utilizes the change of a drain-to-source voltage of at least one of the first switching element and the second switching element.

In addition, in the switching power supply apparatus according to a preferred embodiment of the present invention, the first monitor signal generator preferably utilizes the change of a drain-to-source current of at least one of the first switching element and the second switching element.

In addition, in the switching power supply apparatus according to a preferred embodiment of the present invention, the first monitor signal generator preferably utilizes the change of a voltage occurring between both end portions of the second primary winding.

With these specific configurations of the first monitor signal generator, it is possible to provide switching control according to a preferred embodiment of the present invention.

In addition, in the switching power supply apparatus according to a preferred embodiment of the present invention, the digital control circuit is preferably a DSP (Digital Signal Processor), for example.

In addition, in the switching power supply apparatus according to a preferred embodiment of the present invention, the digital control circuit is preferably an FPGA (Field Programmable Gate Array).

According to various preferred embodiments of the present invention, since switching is performed with an optimal dead time while a plurality of switching elements are not simultaneously turned on, a switching power supply having a high degree of reliability and a high degree of efficiency is obtained. Furthermore, since a switching frequency is constant or substantially constant, a noise due to the switching frequency is easily minimized and prevent, and a switching power supply having an excellent EMI characteristic is obtained.

The above and other elements, features, steps, characteristics, and advantages of the present invention will become more apparent from the following detailed description of the preferred embodiments with reference to the attached drawings.

DETAILED DESCRIPTION OF THE PREFERRED EMBODIMENTS

First Preferred Embodiment

Figure 1:
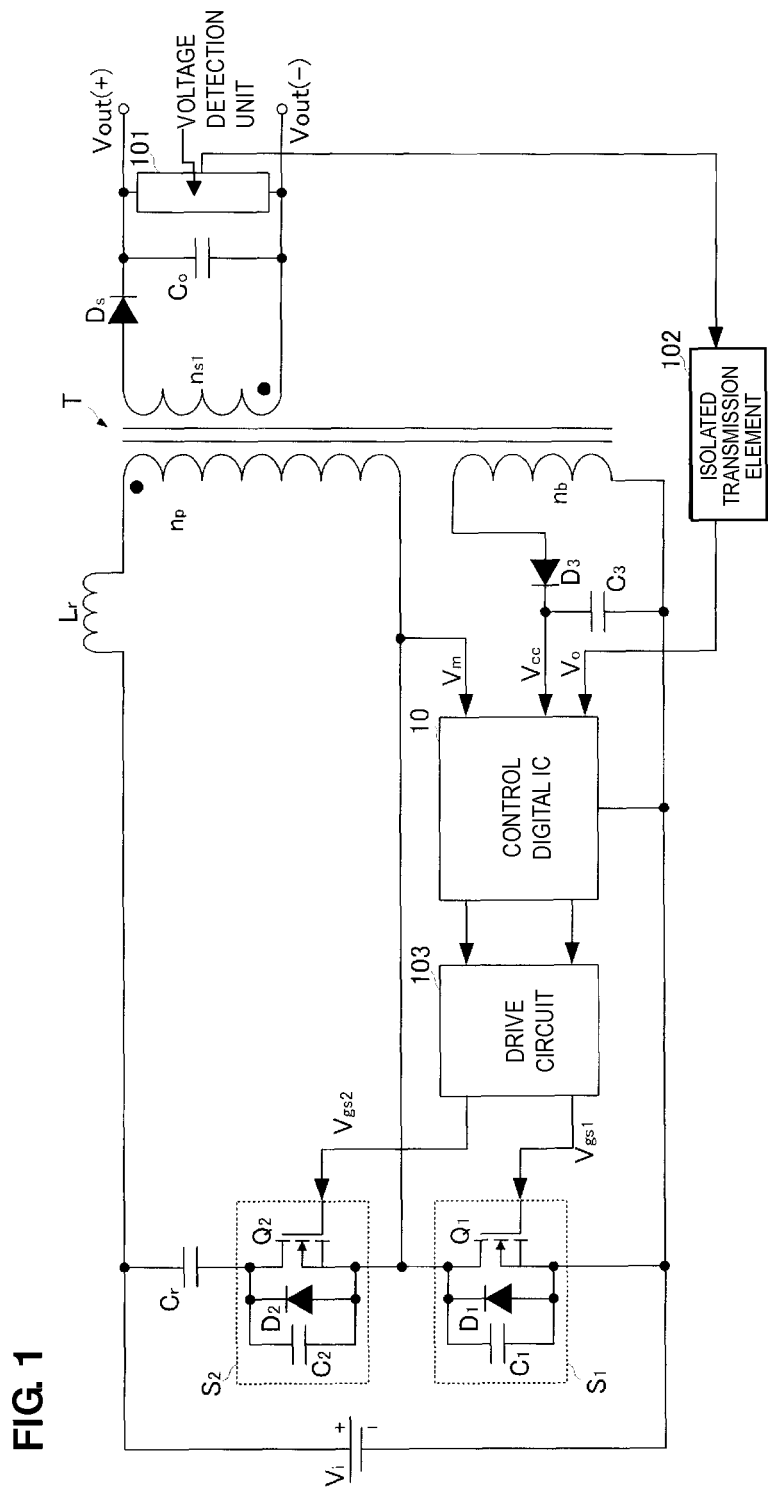
FIG. 1 is a circuit diagram of a switching power supply according to a first preferred embodiment of the present invention.

A switching power supply according to a first preferred embodiment of the present invention will be described with reference to drawings. FIG. 1 is the circuit diagram of the switching power supply according to the first preferred embodiment of the present invention.

Primary-Side Circuit Configuration of Transformer

Preferably, an inductor Lr, a primary winding np of a transformer T, and a first switch circuit S1 are connected in series to both end portions of an input power supply Vi, to which a direct-current input voltage is applied. The first switch circuit S1 includes a first switching element Q1, a diode D1, and a capacitor C1. The first switching element Q1 includes a FET, a drain terminal is connected to the primary winding np of the transformer T, and a source terminal is connected to the input power supply Vi. The diode D1 and the capacitor C1 are connected in parallel between the drain and the source of the first switching element Q1, and may be replaced with a parasitic diode and a parasitic capacitance of the first switching element Q1 that is a FET. The first switching element Q1 performs an on-off operation based on a first switching control signal Vgs1 supplied from a control digital IC 10 through a drive circuit 103.

In addition, preferably, a second switch circuit S2 and a capacitor Cr are connected so as to define a closed circuit including the primary winding np of the transformer T and the inductor Lr. The second switch circuit S2 preferably includes a second switching element Q2 in which a FET is included, a diode D2, and a capacitor C2. The drain terminal of the second switching element Q2 is connected to the capacitor Cr, and the source terminal thereof is connected to the primary winding np of the transformer T. The diode D2 and the capacitor C2 are connected in parallel between the drain and the source of the second switching element Q2, and may be replaced with a parasitic diode and a parasitic capacitance of the second switching element Q2 that is a FET. In the same or substantially the same manner as the first switching element Q1, the second switching element Q2 performs an on-off operation based on a second switching control signal Vgs2 supplied from the control digital IC 10 through the drive circuit 103.

In addition to the above-mentioned primary winding np, a bias winding nb is disposed on the primary side of the transformer T, and one end portion of the bias winding nb is connected to the input power supply Vi. The anode of a diode D3 is connected to the other end portion of the bias winding nb. A capacitor C3 is connected to the cathode of the diode D3. According to this configuration, a rectification smoothing circuit is defined by the diode D3 and the capacitor C3, and a driving voltage Vcc for the control digital IC 10 is supplied to the control digital IC 10.

In addition, a connection side of the primary winding np of the transformer T with the first switch circuit S1 is connected to the control digital IC 10 through a resistor voltage-dividing circuit (not illustrated), and a voltage level at the voltage dividing point of the resistor voltage-dividing circuit is supplied, as a monitor signal Vm, to the control digital IC 10.

For example, the control digital IC 10 preferably includes a DSP or an FPGA. The control digital IC 10 is driven using the above-mentioned driving voltage Vcc, and, based on the monitor signal Vm and a detection voltage signal Vo obtained from the secondary side circuit of the transformer T, generates the first switching control signal Vgs1 used to drive the first switching element Q1 and the second switching control signal Vgs2 used to drive the second switching element Q2. In addition, the specific configuration and control of the control digital IC 10 will be described later.

For example, the drive circuit 103 preferably includes a high-side driver IC or other suitable circuit element, and inputs and boosts the first switching control signal Vgs1 and the second switching control signal Vgs2 into signals whose levels can drive at least the second switching element Q2. The drive circuit 103 outputs the first switching control signal Vgs1 to the first switching element Q1 and outputs the second switching control signal Vgs2 to the second switching element Q2.

Secondary-Side Circuit Configuration of Transformer

A secondary winding ns1 of the transformer T is preferably wound so as to have a reverse polarity with respect to the primary winding np, and both end portions of the secondary winding ns1 are voltage output terminals Vout(+) and Vout(−). The anode of a diode Ds is connected to one end portion on a voltage output terminal Vout(+) side of the secondary winding ns1, and the cathode of the diode Ds is connected to the voltage output terminal Vout(+). In addition, a capacitor Co is connected between both terminals of the voltage output terminals Vout(+) and Vout(−). According to such a configuration as described above, a rectification smoothing circuit including the diode Ds and the capacitor Co is provided.

In addition, a voltage detection unit 101 including a series resistance circuit and other suitable circuit elements is connected between both terminals of the voltage output terminals Vout(+) and Vout(−), generates a detection voltage signal Vo according to an output voltage level between the voltage output terminals Vout(+) and Vout(−), and outputs the detection voltage signal Vo to an isolated transmission element 102.

The isolated transmission element 102 preferably includes a photo coupler or other suitable device, and transmits, to the control digital IC 10 on the primary side, the detection voltage signal Vo generated in the voltage detection unit 101 on the secondary side.

According to such a configuration described above, an isolated-type switching power supply that utilizes a flyback method is provided.

Specific Configuration of Switching Control Circuit

For example, the control digital IC 10 preferably includes a DSP, an FPGA, or other suitable control IC, and generates the first switching control signal Vgs1 used to perform on-off control for the first switching element Q1 and the second switching control signal Vgs2 used to perform on-off control for the second switching element Q2 based on the monitor signal Vm and the detection voltage signal Vo, which are input. At this time, the control digital IC 10 generates the first switching control signal Vgs1 and the second switching control signal Vgs2 while maintaining a constant switching period Ts so that a desired output voltage level is obtained and the first switching element Q1 and the second switching element Q2 are not simultaneously turned on. The generated first switching control signal Vgs1 and second switching control signal Vgs2 are output to the drive circuit 103.

Figure 2A:
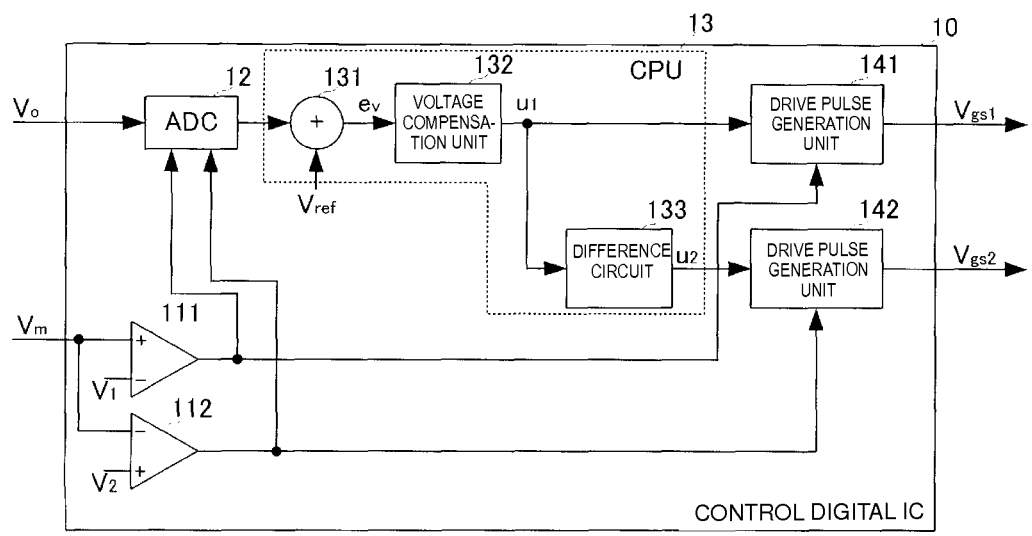
FIGS. 2A and 2B include a circuit diagram illustrating a configuration of an internal block of a control digital IC and a logical block diagram of a voltage compensation unit.
Figure 2B:
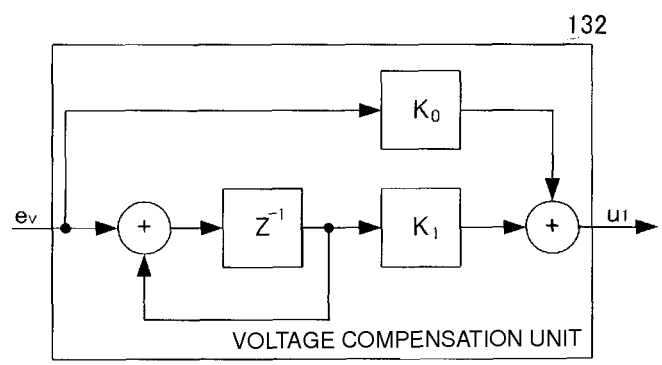

FIG. 2A is a circuit diagram illustrating the configuration of the internal block of the control digital IC 10 and FIG. 2B is the logical block diagram of a voltage compensation unit 132.

The control digital IC 10 preferably includes comparators 111 and 112, an ADC (analog-to-digital converter) 12, a CPU 13, and drive pulse generation units 141 and 142. The CPU 13 includes an adder 131, a voltage compensation unit 132, and a difference circuit 133.

The comparator 121 compares the monitor signal Vm with a predetermined threshold value V1, and outputs a trigger signal that is at an Hi level during a time period when the monitor signal Vm is less than or equal to the threshold value V1 and is at a Low level during a time period when the monitor signal Vm is greater than the threshold value V1. The comparator 122 compares the monitor signal Vm with a predetermined threshold value V2 (>the threshold value V1), and outputs a trigger signal that is at an Hi level during a time period when the monitor signal Vm is greater than or equal to the threshold value V2 and is at a Low level during a time period when the monitor signal Vm is less than the threshold value V2. In addition, while, in the present preferred embodiment, an example has been described in which the comparators 121 and 122 are preferably provided in the control digital IC 10, these comparators 121 and 122 may also be provided separately from the control digital IC 10.

The ADC 12 is an analog-to-digital converter, converts the detection voltage signal Vo from an analog signal into a digital signal, and outputs the digital signal to the adder 13. At this time, the ADC 12 uses, as a trigger, timings at which trigger signals from the comparators 121 and 122 transition from the Low level to the Hi level and starts analog-to-digital conversion. In addition, in the configuration of the present preferred embodiment, it is only necessary for at least the trigger signal from the comparator 121 to be input, and in response to the start timing of the analog-to-digital conversion, it is only necessary to arbitrarily set which one of the trigger signals is used.

The adder 131 calculates a difference voltage ev between the detection voltage signal Vo subjected to digital conversion and a reference voltage level Vref that is a desired voltage level, and supplies the difference voltage ev to the voltage compensation unit 132.

For example, the voltage compensation unit 132 preferably includes a PI controller as illustrated in FIG. 2B, and outputs a control value u1 indicating an on-time Ton1 of the first switching element Q1 based on the difference voltage ev. The voltage compensation unit 132 supplies the control value u1 to the difference circuit 133 and the drive pulse generation unit 141.

By subtracting the on-time Ton1 of the first switching element Q1 based on the control value u1 from the predetermined constant switching period Ts for the drive pulse generation units 141 and 142, the difference circuit 133 calculates an on-time Ton2 of the second switching element Q2.

At this time, taking into account a delay time (TF1 and TF2 in FIG. 4) from a timing when the individual drive pulse generation units 141 and 142 have detected timings at which the trigger signals from the comparators 121 and 122 transition from the Low level to the Hi level to a timing when the first switching control signal Vgs1 is output, the difference circuit 133 executes subtraction processing. In addition, compared to the on-times Ton1 and Ton2, these delay times TF1 and TF2 have extremely short durations as long as the individual switching elements Q1 and Q2 are not simultaneously turned on and a ZVS operation can be effectively performed, and these delay times TF1 and TF2 are preliminarily set as fixed values off-line.

Namely, by utilizing an expression Ton2=Ts−Ton1−(TF1+TF2) with the on-time of the second switching element Q2 as Ton2 with respect to the switching period Ts and the on-time Ton1 of the first switching element Q1, the difference circuit 133 calculates the on-time Ton2 of the second switching element Q2. The difference circuit 133 supplies a control value u2 according to the calculated on-time Ton2 to the drive pulse generation unit 142.

The drive pulse generation unit 141 preferably includes a digital PWM circuit, and uses, as a trigger, a timing at which the trigger signal from the comparator 121 transitions to the Hi level, namely, a timing at which the level of the monitor signal Vm is decreased to the threshold value V1, and causes the first switching control signal Vgs1 to transition to the Hi level.

The drive pulse generation unit 141 preferably includes a counter arranged to counts up to a predetermined value during the time period of the switching period Ts, and continues counting while refreshing a counter value with respect to each switching period Ts. In addition, the timing of the refresh is caused to coincide with the timing at which the first switching control signal Vgs1 transitions to the Hi level.

When having counted up to a count value corresponding to the control value u1, the drive pulse generation unit 141 causes the first switching control signal Vgs1 to transition to the Low level. Accordingly, the drive pulse generation unit 141 can output the first switching control signal Vgs1 that is at the Hi level, during the desired on-time Ton1.

In addition, the drive pulse generation unit 141 outputs the first switching control signal Vgs1 so that the timing at which the first switching control signal Vgs1 transitions to the Hi level constantly coincides with the refresh timing of the counter, that is set based on the switching period Ts as described above. Accordingly, the drive pulse generation unit 141 continuously outputs the first switching control signal Vgs1 with the predetermined constant switching period Ts.

The drive pulse generation unit 142 also preferably includes a digital PWM circuit, and uses, as a trigger, a timing at which the trigger signal from the comparator 122 transitions to the Hi level, namely, a timing at which the level of the monitor signal Vm is increased to the threshold value V2, and causes the second switching control signal Vgs2 to transition to the Hi level.

The drive pulse generation unit 142 also preferably includes a counter arranged to count up, and continues counting while refreshing a counter value with respect to each switching period Ts. In addition, the timing of the refresh coincides with the timing at which the second switching control signal Vgs2 transitions to the Hi level.

When having counted up to a count value corresponding to the given control value u2, the drive pulse generation unit 142 causes the second switching control signal Vgs2 to transition to the Low level. Accordingly, the drive pulse generation unit 142 outputs the second switching control signal Vgs2 at the Hi level, during the on-time Ton2 that is equal or substantially equal to a value obtained by subtracting the on-time Ton1 of the first switching element Q1 from the above-mentioned switching period Ts.

Next, the above-mentioned processing control will be described using a flowchart and a waveform diagram.

Figure 3:
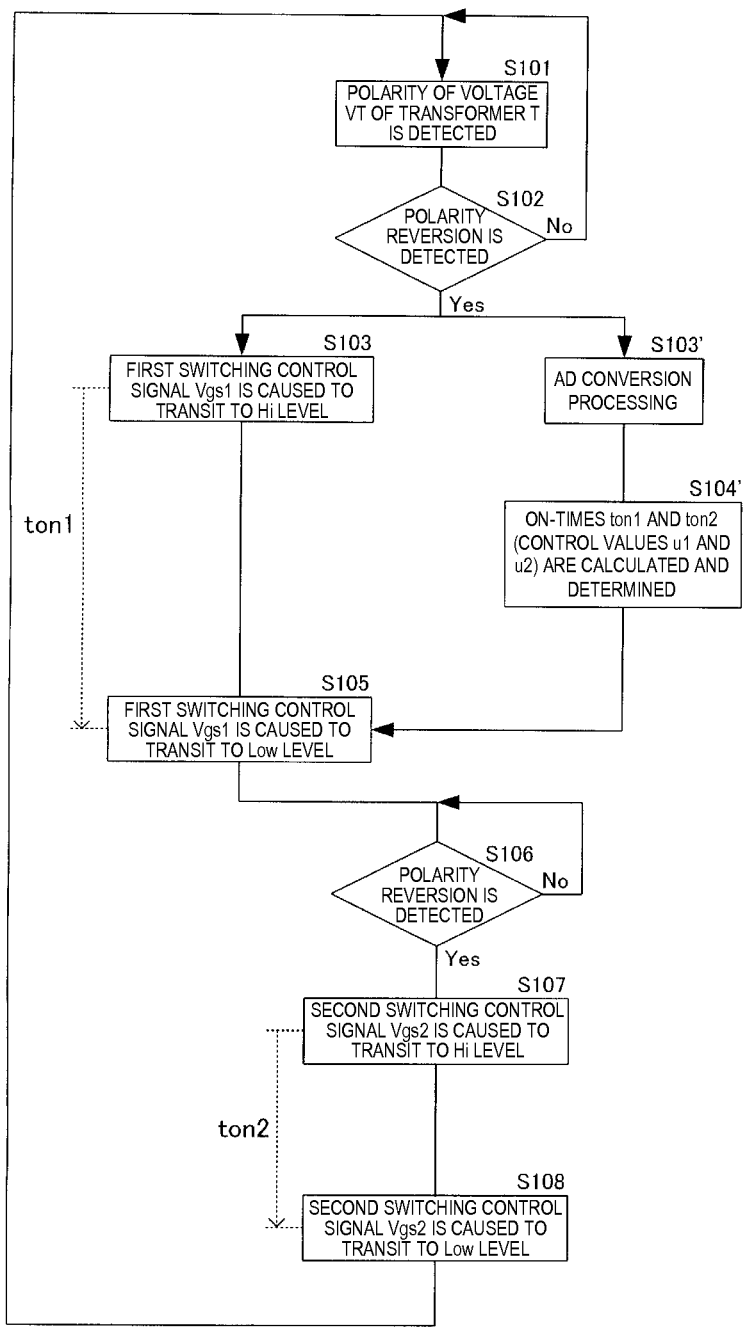
FIG. 3 is a flowchart illustrating a switching control flow of the control digital IC.
Figure 4:
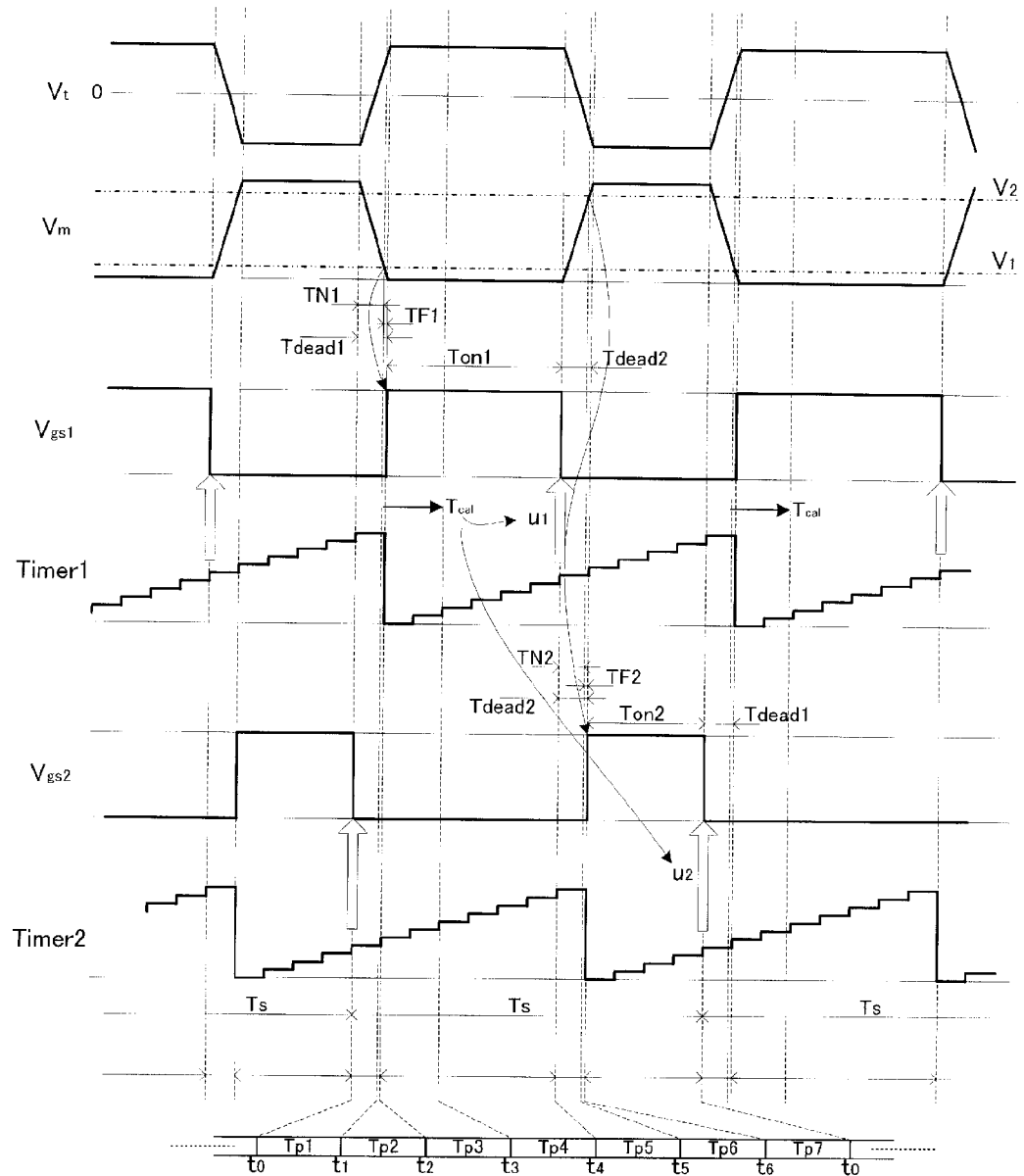
FIG. 4 is a waveform diagram illustrating a temporal relationship between individual signals.

FIG. 3 is a flowchart illustrating the switching control flow of the control digital IC 10. FIG. 4 is a waveform diagram illustrating a temporal relationship between the states of individual signals.

In addition, while the control to be described below is repeatedly performed with the switching period Ts, for convenience of description, the control processing for a specific time period (in the following description, one period of the switching period Ts from the corresponding timing t0 with a timing at which the second switching control signal Vgs2 transitions to the Low level as t0) will be described.

(1) State 1 [Time Period Tp1: Timing t0 to t1]

As illustrated with respect to a timing t0 in FIG. 4, when the second switching control signal Vgs2 is caused to transition to the Low level, a transformer voltage Vt increases. In response to this, the monitor signal Vm decreases.

The control digital IC 10 continuously detects the polarity of the transformer voltage Vt of the transformer T using the monitor signal Vm (S101), and detects the change of magnetic flux due to the increase of the transformer voltage Vt based on the voltage level of the monitor signal Vm being decreased to reach the threshold value V1 (S102: Yes). At this time, by a time period from a time when the voltage level of the monitor signal Vm begins to be decreased to a time when the voltage level of the monitor signal Vm reaches the threshold value V1, a delay time TN1 occurs. This delay time TN1 is determined based on a load state. In addition, since the control digital IC 10 does not detect polarity reversal until a timing t0, the control digital IC 10 continuously detects the polarity of the transformer voltage Vt using the monitor signal Vm (S102: No→S101).

(2) State 2 [Time Period Tp2: Timing t1 to t2]

As illustrated with respect to a timing t1 in FIG. 4, when the control digital IC 10 detects the change of magnetic flux of the transformer voltage Vt based on the monitor signal Vm having reached the threshold value V1, the control digital IC 10 causes the first switching control signal Vgs1 to transition to the Hi level after a predetermined minute delay time TF1 (S103). Accordingly, the first switching control signal Vgs1 transitions to the Hi level at a timing t2 that occurs after the extremely short delay time TF1, after a timing at which it is detected that the monitor signal Vm has reached the threshold value V1.

As illustrated in state 1 and state 2 above, at a time (corresponding to the delay time TN1) when the monitor signal Vm has reached the threshold value V1 of a predetermined level set to a level equal or substantially equal to the Low level, the change of magnetic flux of the transformer voltage Vt due to the transition of the second switching control signal Vgs2 to the Low level is detected, and the first switching control signal Vgs1 is caused to transition to the Hi level after the minute delay time TF1. Consequently, a delay time Tdead1 (=TN1+TF1) forcibly occurs between a timing at which the second switching control signal Vgs2 transitions to the Low level and a timing at which the first switching control signal Vgs1 transitions to the Hi level. Accordingly, at this timing, the second switching control signal Vgs2 and the first switching control signal Vgs1 are prevented from being simultaneously in the Hi level, namely, the first switching element Q1 and the second switching element Q2 are prevented from being simultaneously turned on. In addition, the threshold value V1 is set to a voltage equal or substantially equal to the Low level of the monitor signal Vm, and thus, at a timing at which the first switching control signal Vgs1 is supplied to the switching element Q1, the drain-to-source voltage of the switching element Q1 is "0" electrical potential or about "0" electrical potential, and zero-voltage switching (ZVS) is achieved. In addition, since a timing at which the first switching control signal Vgs1 transitions to the Hi level is controlled using the threshold value V1, it is possible to cause the first switching control signal Vgs1 to transition to the Hi level at an optimal timing suitable for a load situation. Furthermore, by providing the minute delay time TF1, it is possible to ensure more certain simultaneous turn on and the ZVS operation while maintaining an adequate timing.

(3) State 3 [Time Period Tp3: Timing t2 to t3]

At a timing at which the first switching control signal Vgs1 transitions to the Hi level, the control digital IC resets the count value of a timer used for the first switching control signal Vgs1 and starts counting up.

Simultaneously, after having caused the first switching control signal Vgs1 to transition to the Hi level, the control digital IC 10 A/D-converts the detection voltage signal Vo, and calculates a difference value ev with respect to the reference voltage level Vref supplying a desired voltage level (S103').

Based on the corresponding difference value ev, the control digital IC 10 calculates the on-time Ton1 of the first switching control signal Vgs1, and calculates and determines the control value u1 giving the corresponding on-time Ton1 as a counter value. At the same time, by subtracting the on-time Ton1 of the first switching control signal Vgs1 from the switching period Ts of a predetermined constant value, the control digital IC 10 calculates the on-time Ton2 of the second switching control signal Vgs2, and calculates and determines the control value u2 using the corresponding on-time Ton2 as a counter value (S104'). In addition, at this time, taking into account the above-mentioned minute delay time TF1 and the minute delay time TF2 described later, the corresponding subtraction processing is performed. Furthermore, taking into account the delay time Tdead1 including the corresponding minute delay time TF1 and a delay time Tdead2 including the minute delay time TF2, the subtraction processing may be performed. In addition, since these delay times are extremely short for the on-times Ton1 and Ton2 of the switching elements Q1 and Q2, a substantially constant switching period Ts is maintained.

Usually, a time length Tcal that is required to calculate and determine such control values u1 and u2 is extremely short. Therefore, the determination timing Tcal of the control values u1 and u2 when a timing at which the first switching control signal Vgs1 is caused to transition to the Hi level is regarded as a base point and becomes a timing (a timing t3 in FIG. 4) extremely earlier than a timing (a timing t4 in FIG. 4) at which the on-time Ton1 of the first switching control signal Vgs1, provided by the control value u1, is terminated. Accordingly, it is possible to effectively set a timing at which the first switching control signal Vgs1 is caused to transition to the Low level.

(4) State 4 [Time Period Tp4: Timing t3 to t4]

When detecting that the count value of the timer used for the first switching control signal Vgs1 has reached the count value set by the control value u1, the control digital IC 10 causes the first switching control signal Vgs1 to transition to the Low level as illustrated with respect to the timing t4 in FIG. 4 (S105). Accordingly, the control digital IC 10 supplies the first switching control signal Vgs1 at the Hi level to the first switching element Q1 instead of the desired on-time Ton1.

(5) State 5 [Time Period Tp5: Timing t4 to t5]

As illustrated with respect to the timing t4 in FIG. 4, when the first switching control signal Vgs1 has been caused to transition to the Low level, the transformer voltage Vt decreases. In response to this decrease, the monitor signal Vm obtained from an end portion of the first switch circuit S1 side of the transformer T increases.

The control digital IC 10 detects polarity reversal due to the decreasing transformer voltage Vt based on the voltage level of the monitor signal Vm being increased to reach the threshold value V2 (S106: Yes). At this time, by a time period from a time when the voltage level of the monitor signal Vm begins to be increased to a time when the voltage level of the monitor signal Vm reaches the threshold value V2, a delay time TN2 occurs. This delay time TN2 is determined based on a load state. In addition, since the control digital IC 10 does not detect polarity reversal until a timing t4, the control digital IC 10 continuously detects the polarity of the transformer voltage Vt using the monitor signal Vm (S106: No).

(6) State 6 [Time Period Tp6: Timing t5 to t6]

As illustrated with respect to a timing t5 in FIG. 4, when the control digital IC 10 detects the change of magnetic flux of the transformer voltage Vt based on the monitor signal Vm having reached the threshold value V2, the control digital IC 10 causes the second switching control signal Vgs2 to transition to the Hi level after the predetermined minute delay time TF2 (S108). At this time, the second switching control signal Vgs2 transitions to the Hi level at a timing t6 that is located after the extremely short delay time TF2, after a timing at which it is detected that the monitor signal Vm has reached the threshold value V2.

As illustrated in the above-described state 5 and state 6, at a time (corresponds to the delay time TN2) when the monitor signal Vm has reached the threshold value V2 of a predetermined level set to a level substantially equal to the Hi level, the change of magnetic flux of the transformer voltage Vt due to the transition of the first switching control signal Vgs1 to the Low level is detected, and the second switching control signal Vgs2 is caused to transition to the Hi level after the minute delay time TF2. Consequently, a delay time Tdead2 (=TN2+TF2) forcibly occurs between a timing at which the first switching control signal Vgs1 transitions to the Low level and a timing at which the second switching control signal Vgs2 transitions to the Hi level. Accordingly, at this timing, the first switching control signal Vgs1 and the second switching control signal Vgs2 are prevented from being simultaneously in the Hi level, namely, the first switching element Q1 and the second switching element Q2 are prevented from being simultaneously turned on. In addition, the threshold value V2 is set to a voltage substantially equal to the Hi level of the monitor signal Vm, and thus, at a timing at which the second switching control signal Vgs2 is supplied to the switching element Q2, the drain-to-source voltage of the switching element Q2 becomes "0" electrical potential or about "0" electrical potential, and zero-voltage switching (ZVS) is achieved. In addition, since a timing at which the second switching control signal Vgs2 transitions to the Hi level is controlled using the threshold value V2, it is possible to cause the second switching control signal Vgs2 to transition to the Hi level at an optimal timing suitable for a load situation. Furthermore, by providing the minute delay time TF2, it is possible to ensure simultaneous turn on and the ZVS operation while maintaining an adequate timing.

(7) State 7 [Time Period Tp7: Timing t7 to t0]

At a timing at which the second switching control signal Vgs2 transitions to the Hi level, the control digital IC resets the count value of a timer used for the second switching control signal Vgs2 and starts counting up.

In addition, when detecting that the count value of the timer used for the second switching control signal Vgs2 has reached the count value set by the control value u2 calculated for the above-mentioned time period Tp3, the control digital IC 10 causes the second switching control signal Vgs2 to transition to the Low level (S108). Accordingly, the control digital IC 10 can supply the second switching control signal Vgs2 at the Hi level to the second switching element Q2 over the on-time Ton2 that is arbitrarily set based on the constant switching period Ts and the on-time Ton1 of the first switching control signal Vgs1.

As described above, by utilizing the configuration and processing of the present preferred embodiment, it is possible to set the on-time Ton1 of the first switching control signal Vgs1 so as to obtain a desired output voltage, and it is possible to prevent the on-time Ton1 of the corresponding first switching control signal Vgs1 and the on-time Ton2 of the second switching control signal Vgs2 from overlapping each other on a time axis. Accordingly, it is possible to prevent damage to a switching element due to a short circuit from occurring and it is also possible to provide a switching power supply having a high degree of reliability.

In addition, the delay times Tdead1 and Tdead2 include the minute delay times TF1 and TF2 and are set to adequate values suitable for a load situation based on the change of magnetic flux of the transformer voltage Vt so that the on-times Ton1 and Ton2 are spaced from each other on the time axis. Therefore, a switching power supply having a high degree of efficiency is obtained.

Furthermore, since the switching period Ts is controlled so as to be constant or substantially constant, a noise due to the switching period Ts is easily dealt with and a switching power supply having low EMI is obtained.

Figure 5:
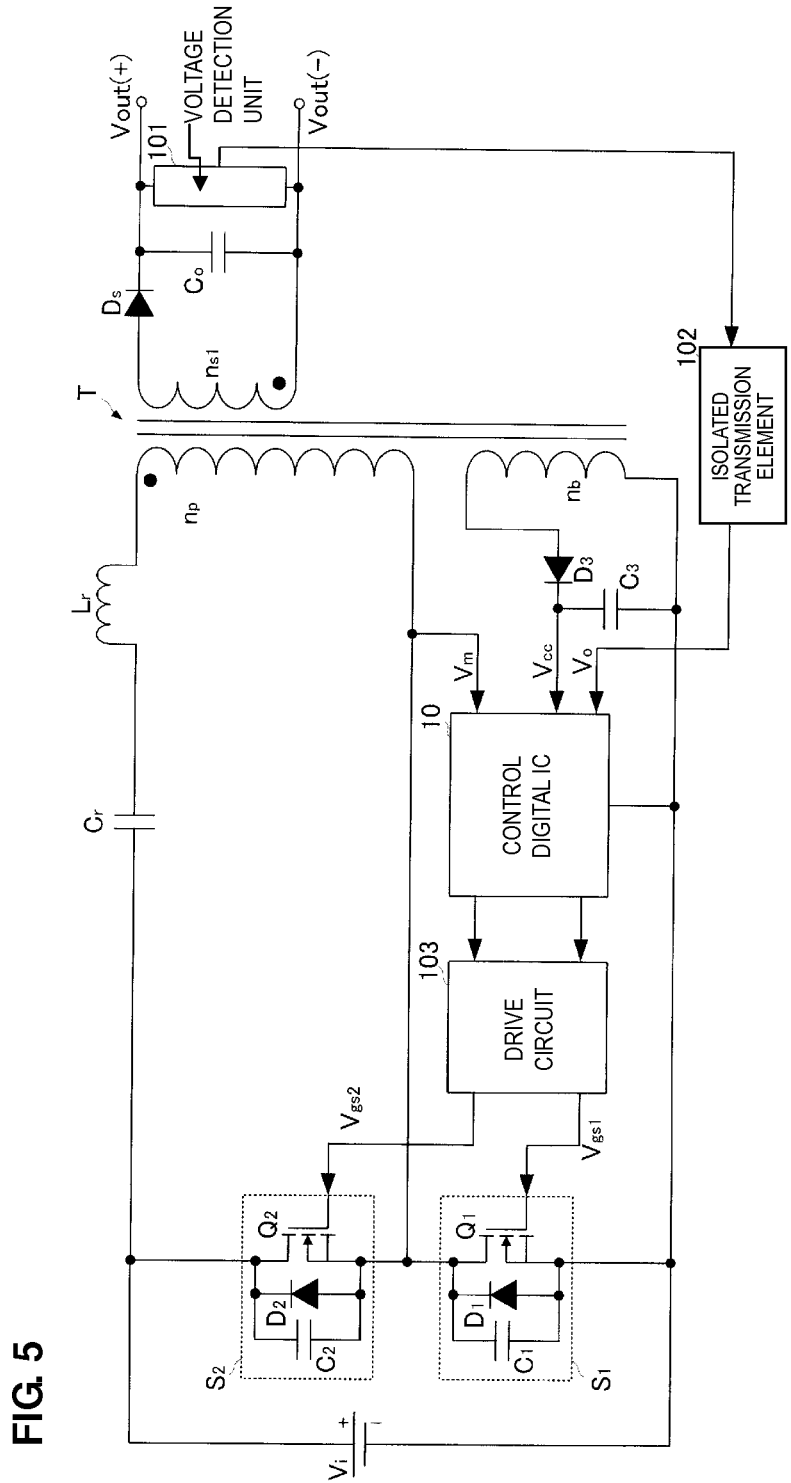
FIG. 5 is a circuit diagram of a switching power supply including another circuit configuration according to the first preferred embodiment of the present invention.

In addition, while, in the present preferred embodiment, a case has been illustrated in which the capacitor Cr defining a closed circuit along with the primary winding np, the inductor L1, and the switch circuit S2 is preferably connected in parallel to the input power supply Vi on the primary side of the transformer T, a circuit configuration may be provided in which the capacitor Cr is connected in series to the input power supply Vi, as illustrated in FIG. 5. FIG. 5 is the circuit diagram of a switching power supply including another circuit configuration according to the first preferred embodiment. Even in such a configuration, it is possible to provide the above-described switching control, and it is possible to obtain the same or substantially the same functional effect.

In addition, while, in the above description, an example has been illustrated in which timers are preferably individually provided for the control of the on-times Ton1 and Ton2, by regarding the delay time Tdead1 and the delay time Tdead2 as a same value and preliminarily setting the delay time Tdead1 and the delay time Tdead2 to a fixed value, it is possible to control the on-times Ton1 and Ton2 using only one timer.

Second Preferred Embodiment

Figure 6:
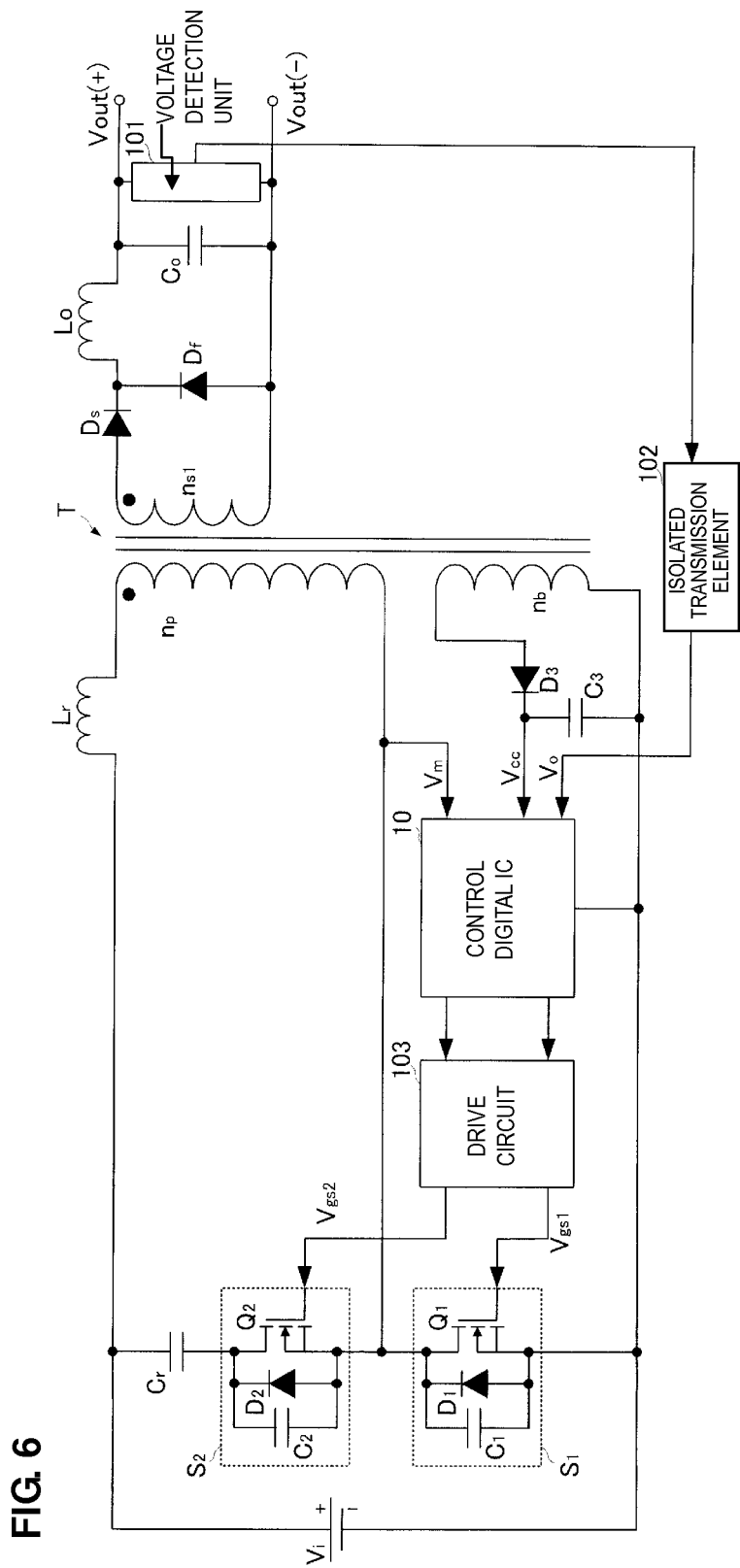
FIG. 6 is a circuit diagram of a switching power supply according to a second preferred embodiment of the present invention.

Next, a switching power supply according to a second preferred embodiment of the present invention will be described with reference to the drawings. FIG. 6 is the circuit diagram of the switching power supply according to the second preferred embodiment.

As illustrated in FIG. 6, in the switching power supply according to the present preferred embodiment, the primary winding np and the secondary winding ns1 of the transformer T are preferably wound so as to have the same polarity. A circuit pattern on the primary side of the transformer T and the isolated transmission element 102 are preferably the same as those in the above-mentioned switching power supply illustrated in FIG. 1, and a circuit pattern on a secondary side is preferably different from that in the above-mentioned switching power supply illustrated in FIG. 1.

Preferably, the anode of the diode Ds is connected to one end portion of the secondary winding ns1 of the switching power supply according to the present preferred embodiment, and the cathode of the corresponding diode Ds is connected to the voltage output terminal Vout(+) through an inductor Lo. The other end portion of the secondary winding ns1 is connected to the voltage output terminal Vout(−).

In addition, a diode Df is connected in parallel between both terminals of the secondary winding ns1. At this time, the cathode of the diode Df is connected to the inductor Lo that functions as a filter inductor.

In addition, the capacitor Co is connected between both terminals of the voltage output terminals Vout(+) and Vout(−). According to such a configuration as described above, a rectification smoothing circuit including the diodes Ds and Df, the inductor Lo, and the capacitor Co is provided. In addition, a voltage detection unit 101 including a series resistance circuit and other suitable circuit elements is preferably connected between both terminals of the voltage output terminals Vout(+) and Vout(−), generates a detection voltage signal Vo according to an output voltage level between both terminals of the voltage output terminals Vout(+) and Vout(−), and outputs the detection voltage signal Vo to the isolated transmission element 102.

According to such a configuration described above, an isolated-type switching power supply based on a forward method is provided. In addition, even in such a configuration, it is possible to apply the above-described switching control according to the first preferred embodiment, and it is possible to obtain the same or substantially the same functional effect.

Third Preferred Embodiment

Figure 7:
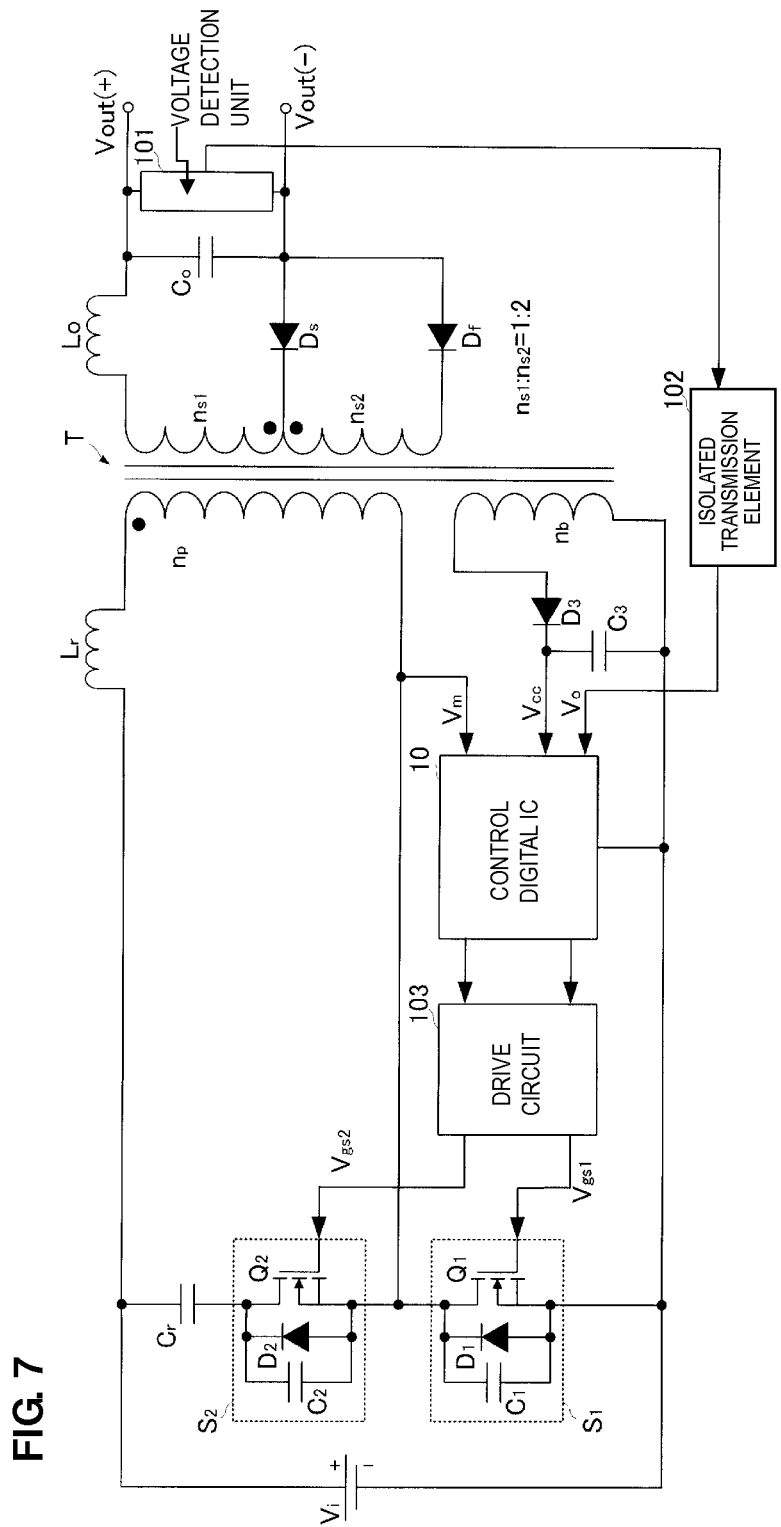
FIG. 7 is a circuit diagram of a switching power supply according to a third preferred embodiment of the present invention.

Next, a switching power supply according to a third preferred embodiment of the present invention will be described with reference to the drawings. FIG. 7 is the circuit diagram of the switching power supply according to the third preferred embodiment.

As illustrated in FIG. 7, in the switching power supply according to the present preferred embodiment, a circuit pattern on the primary side of the transformer T and the isolated transmission element 102 are preferably the same as those in the above-mentioned switching power supply illustrated in FIG. 1, and the transformer T and a circuit pattern on the secondary side thereof are preferably different from those in the above-mentioned switching power supply illustrated in FIG. 1.

The transformer T is preferably a composite-type transformer in which two secondary windings ns1 and ns2 are arranged with respect to one primary winding np. The first secondary winding ns1 of the transformer T is wound with the polarity that is opposite to the primary winding np, and the second secondary winding ns2 is wound with a polarity that is the same as the primary winding np. At this time, the first secondary winding ns1 and the second secondary winding ns2 are configured so that a winding ratio between the first secondary winding ns1 and the second secondary winding ns2 preferably complies with ns1:ns2=1:2, for example.

The voltage output terminal Vout(+) is connected to one end portion of the first secondary winding ns1 through the inductor Lo. The cathode of the diode Ds is connected to the other end portion of the first secondary winding ns1, and the anode of the corresponding diode Ds is connected to the voltage output terminal Vout(−).

One end portion of the second secondary winding ns2 is connected to the other end portion of the first secondary winding ns1. The cathode of the diode Df is connected to one end portion of the second secondary winding ns2, and the anode of the corresponding diode Df is also connected to the voltage output terminal Vout(−).

In addition, a capacitor Co is preferably connected between both terminals of the voltage output terminals Vout(+) and Vout(−). According to such a configuration as described above, a rectification smoothing circuit including the diodes Ds and Df, the inductor Lo, and the capacitor Co, is provided. In addition, a voltage detection unit 101 including a series resistance circuit and other suitable circuit elements is preferably connected between both terminals of the voltage output terminals Vout(+) and Vout(−), generates a detection voltage signal Vo according to an output voltage level between both terminals of the voltage output terminals Vout(+) and Vout(−), and outputs the detection voltage signal Vo to the isolated transmission element 102.

In the switching power supply including such a configuration, for a time period when the first switch circuit S1 is turned on and the second switch circuit S2 is turned off, a current flows through a loop, such as the voltage output terminal Vout(−)→the diode Df→the second secondary winding ns2→the first secondary winding ns1→the inductor Lo→the voltage output terminal Vout(+), for example, and for a time period when the first switch circuit S1 is turned off and the second switch circuit S2 is turned on, a current flows through a loop such as the voltage output terminal Vout(−)→the diode Ds→the first secondary winding ns1→the inductor Lo→the voltage output terminal Vout(+), for example. Therefore, for any one of the on-period of the first switch circuit S1 (the off-period of the second switch circuit S2) and the off-period of the first switch circuit S1 (the on-period of the second switch circuit S2), energy transmission can be performed from the primary side of the transformer T to the secondary side thereof. Namely, it is possible to practically perform energy transmission from the primary side of the transformer T to the secondary side thereof over substantially the entire time period of the switching period Ts.

Here, while energy transmission is not performed for a time period for which the switching element is switched, the delay times Tdead1 and Tdead2 are optimized by applying the above-mentioned switching control. Therefore, it is possible to very efficiently perform energy transmission over substantially the entire time period of the switching period Ts.

Furthermore, as illustrated in the present preferred embodiment, by causing the winding ratio between the first secondary winding ns1 and the second secondary winding ns2 preferably to comply with ns1:ns2=1:2, for example, it is possible to obtain the same or substantially the same output voltage level for any one of the on-period of the first switch circuit S1 (the off-period of the second switch circuit S2) and the off-period of the first switch circuit S1 (the on-period of the second switch circuit S2). Accordingly, it is possible to prevent or minimize a ripple component of the output voltage.

Figure 8:
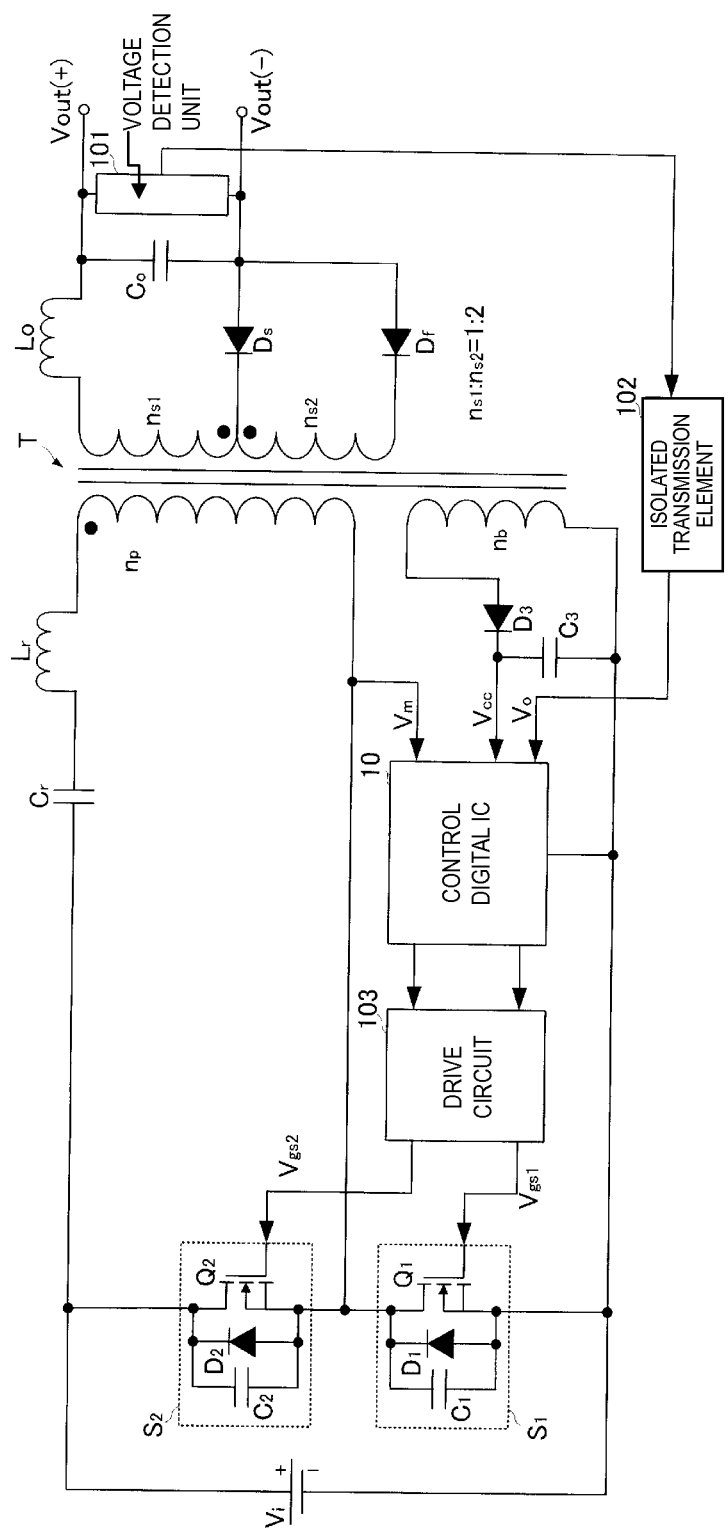
FIG. 8 is a circuit diagram of a switching power supply including another circuit configuration according to the third preferred embodiment of the present invention.
Figure 9:
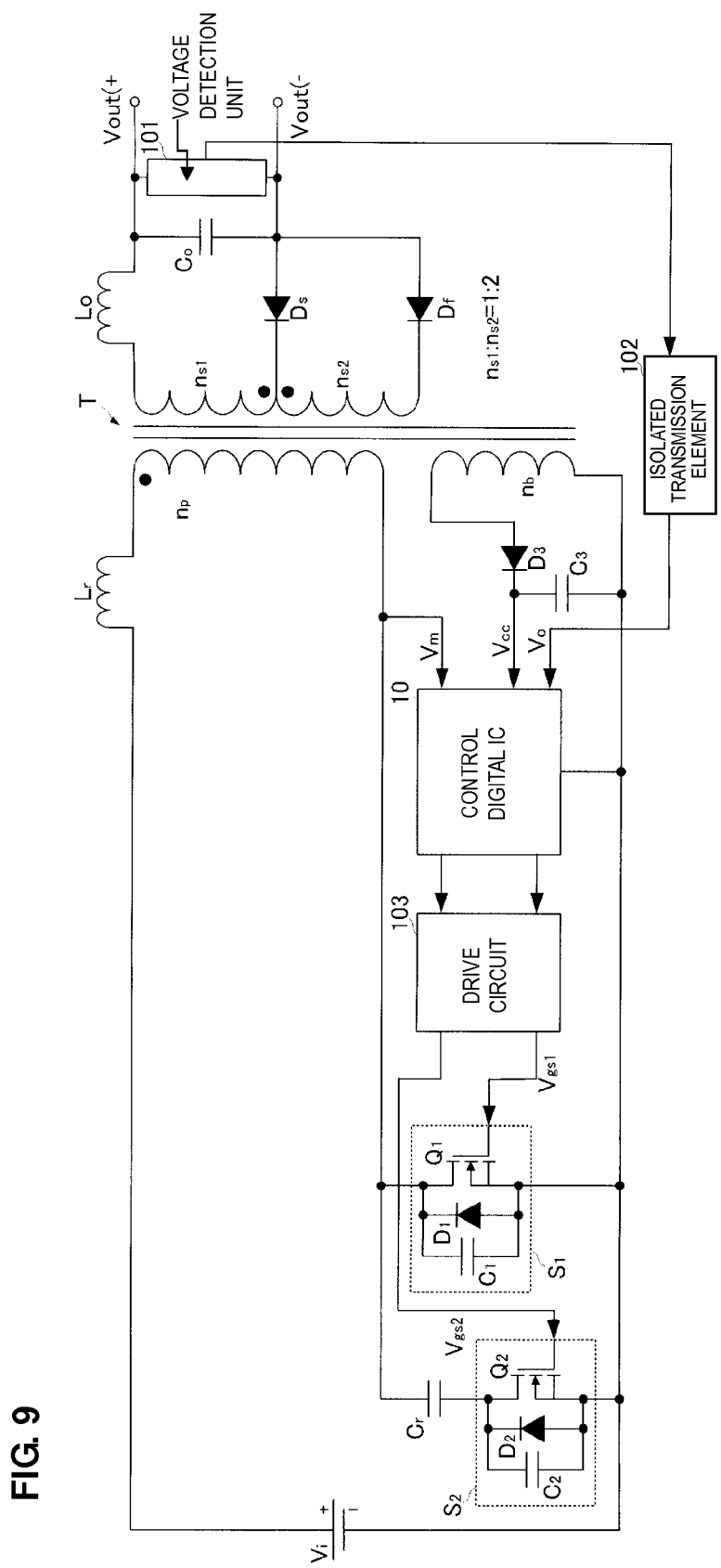
FIG. 9 is a circuit diagram of a switching power supply including another circuit configuration according to the third preferred embodiment of the present invention.

In addition, while, in the switching power supply in FIG. 7 of the present preferred embodiment, a case has been illustrated in which the capacitor Cr defining a closed circuit along with the primary winding np, the inductor L1, and the switch circuit S2 is preferably connected in parallel to the input power supply Vi on the primary side of the transformer T, a circuit configuration may be provided in which the capacitor Cr is connected in series to the input power supply Vi, as illustrated in FIG. 8. FIG. 8 is a circuit diagram of a switching power supply including another circuit configuration according to the third preferred embodiment. In addition, as illustrated in FIG. 9, a circuit configuration may be provided in which a series circuit including the second switch circuit S2 and the capacitor Cr is connected in parallel to the first switch circuit S1. FIG. 9 is the circuit diagram of a switching power supply including another circuit configuration according to the third preferred embodiment. Even in such a configuration, it is possible to provide the above-described switching control, and it is possible to obtain the same or substantially the same functional effect.

Fourth Preferred Embodiment

Figure 10:
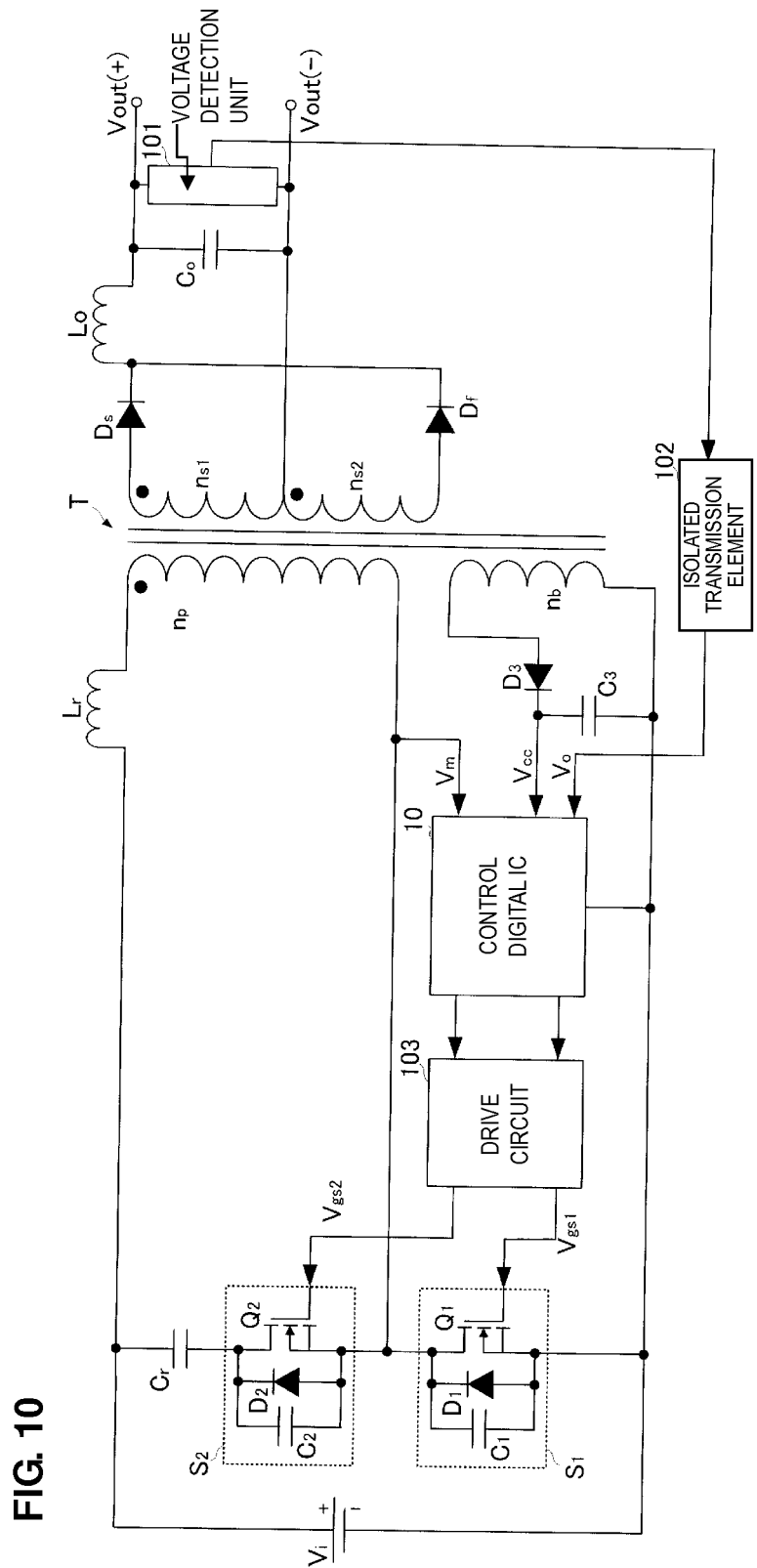
FIG. 10 is a circuit diagram of a switching power supply according to a fourth preferred embodiment of the present invention.

Next, a switching power supply according to a fourth preferred embodiment of the present invention will be described with reference to the drawings. FIG. 10 is a circuit diagram of a switching power supply according to the fourth preferred embodiment.

As illustrated in FIG. 10, in the switching power supply according to the present preferred embodiment, a circuit pattern on the primary side of the transformer T and the isolated transmission element 102 are preferably the same as those in the above-mentioned switching power supply illustrated in FIG. 1, and the transformer T and a circuit pattern on a secondary side are preferably different from those in the above-mentioned switching power supply illustrated in FIG. 1.

The transformer T preferably is a composite-type transformer in which two secondary windings ns1 and ns2 are arranged with respect to one primary winding np. The first secondary winding ns1 of the transformer T is wound with a polarity that is the same as the primary winding np, and the second secondary winding ns2 is also wound with a polarity that is the same as the primary winding np.

The anode of the diode Ds is connected to one end portion of the first secondary winding ns1, and the cathode of the corresponding diode Ds is connected to the voltage output terminal Vout(+) through the inductor Lo. The other end portion of the first secondary winding ns1 is connected to the voltage output terminal Vout(−).

One end portion of the second secondary winding ns2 is connected to the other end portion of the first secondary winding ns1. The cathode of the diode Df is connected to the other end portion of the second secondary winding ns2, and the anode of the corresponding diode Df is also connected to the voltage output terminal Vout(+) through the inductor Lo.

In addition, a capacitor Co is preferably connected between both terminals of the voltage output terminals Vout(+) and Vout(−). According to such a configuration as described above, a rectification smoothing circuit including the diodes Ds and Df, the inductor Lo, and the capacitor Co, is provided. In addition, a voltage detection unit 101 including a series resistance circuit and other suitable circuit elements is preferably connected between both terminals of the voltage output terminals Vout(+) and Vout(−), generates a detection voltage signal Vo according to an output voltage level between both terminals of the voltage output terminals Vout(+) and Vout(−), and outputs the detection voltage signal Vo to the isolated transmission element 102.

Using such a configuration, it is possible to configure a switching power supply utilizing a center tap-type full-wave rectifier circuit. In addition, even with such a configuration, it is possible to apply the above-described switching control according to the first preferred embodiment, and it is possible to obtain the same or substantially the same functional effect.

Figure 11:
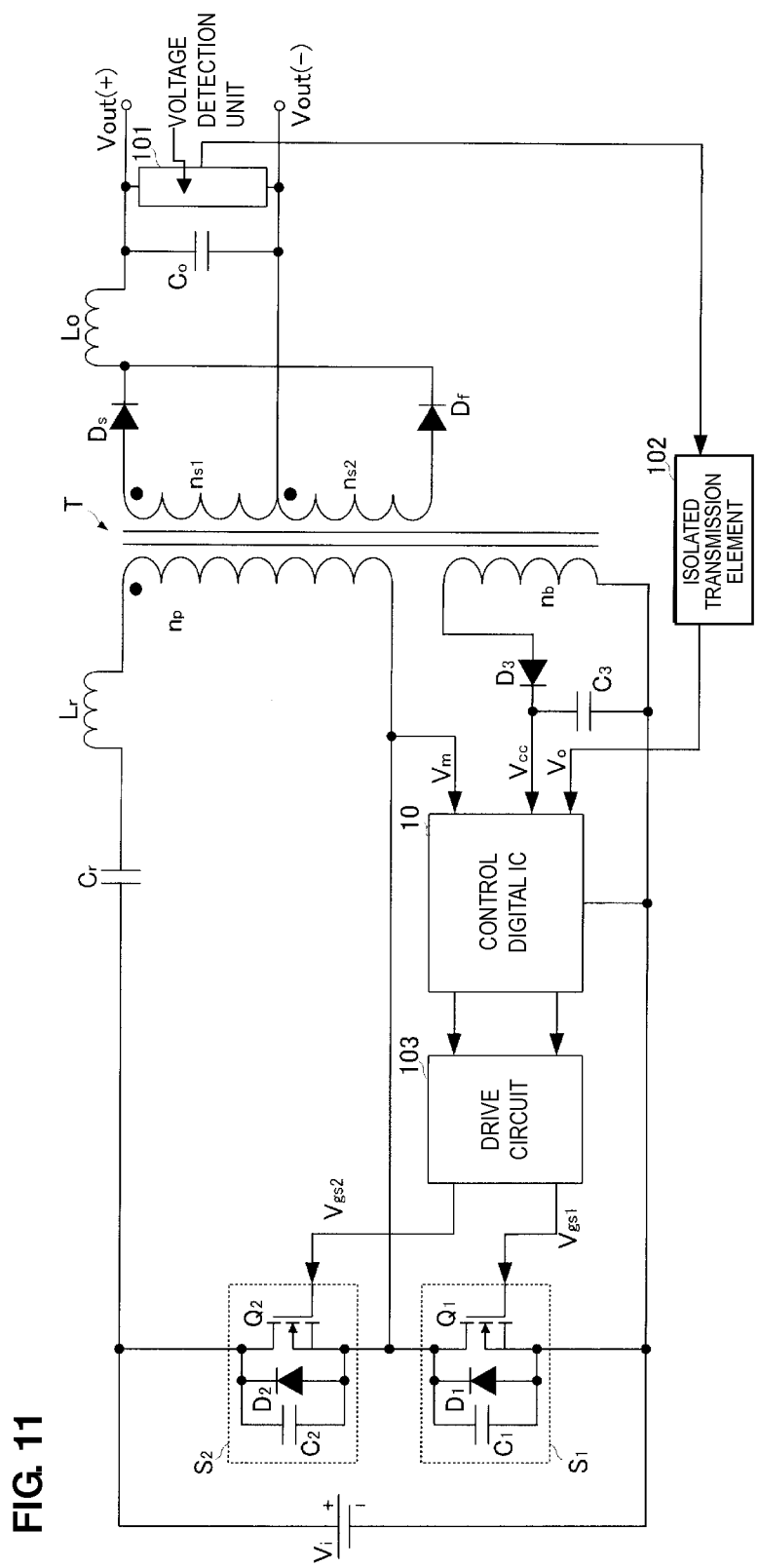
FIG. 11 is a circuit diagram of a switching power supply including another circuit configuration according to the fourth preferred embodiment of the present invention.
Figure 12:
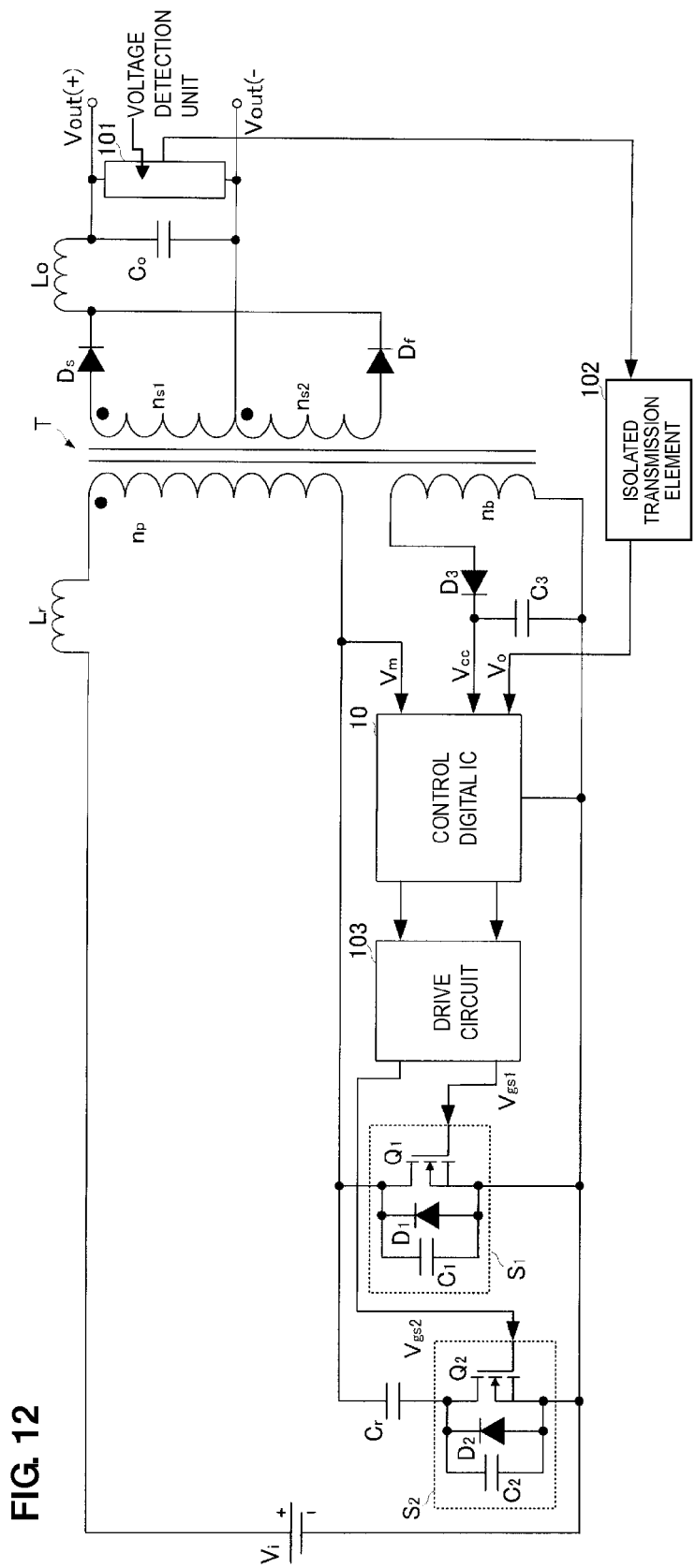
FIG. 12 is a circuit diagram of a switching power supply including another circuit configuration according to the fourth preferred embodiment of the present invention.

In addition, while, in the switching power supply shown in FIG. 10 according to the present preferred embodiment, a case has been illustrated in which the capacitor Cr defining a closed circuit along with the primary winding np, the inductor L1, and the switch circuit S2 is preferably connected in parallel to the input power supply Vi on the primary side of the transformer T, a circuit configuration may be provided in which the capacitor Cr is connected in series to the input power supply Vi, as illustrated in FIG. 11. FIG. 11 is the circuit diagram of a switching power supply including another circuit configuration according to the fourth preferred embodiment. In addition, as illustrated in FIG. 12, a circuit configuration may be provided in which a series circuit including the second switch circuit S2 and the capacitor Cr is connected in parallel to the first switch circuit S1. FIG. 12 is the circuit diagram of a switching power supply including another circuit configuration according to the fourth preferred embodiment. Even in such a configuration, it is possible to provide the above-described switching control, and it is possible to obtain the same or substantially the same functional effect.

Fifth Preferred Embodiment

Figure 13:
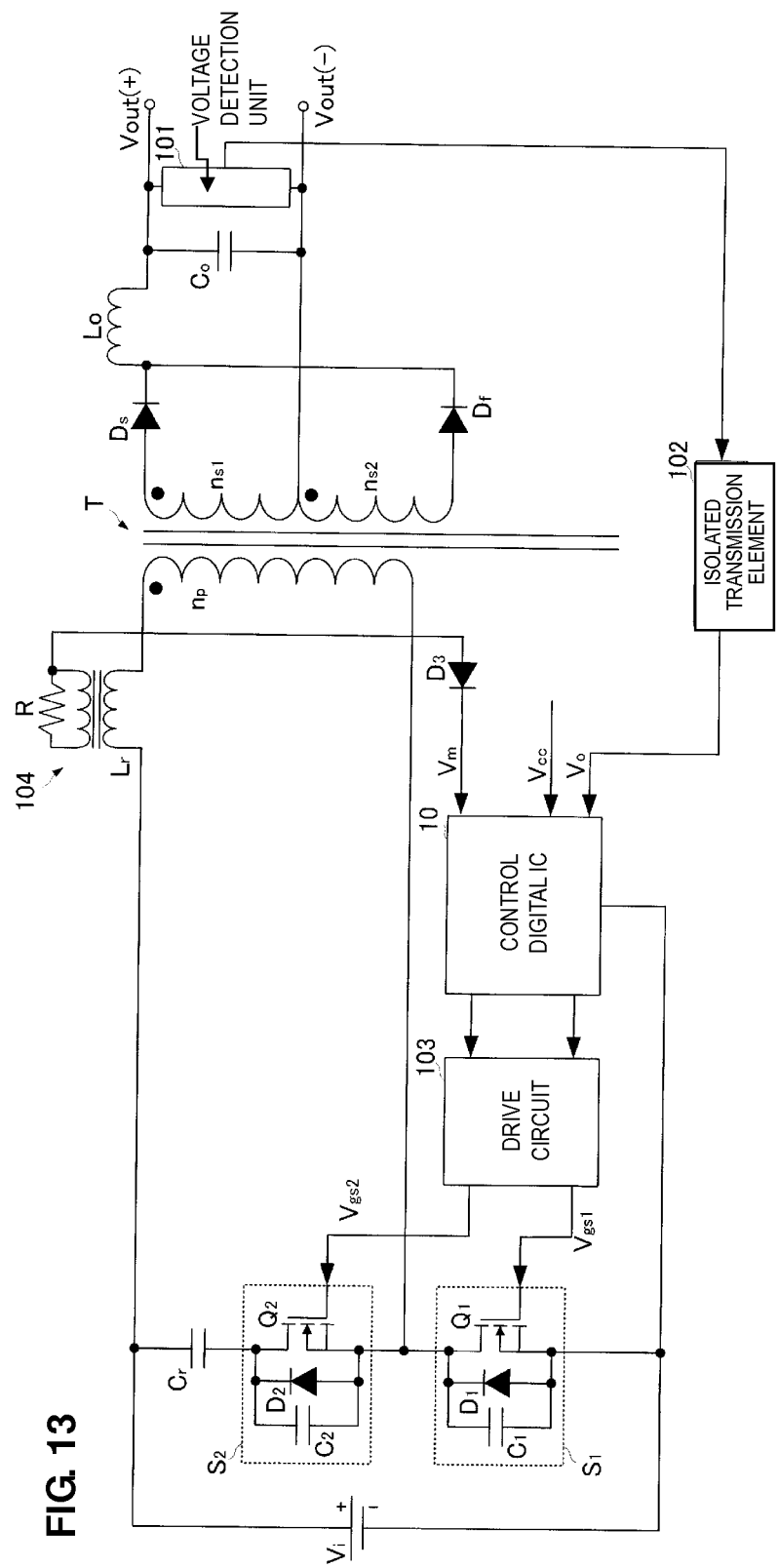
FIG. 13 is a circuit diagram of a switching power supply according to a fifth preferred embodiment of the present invention.

Next, a switching power supply according to a fifth preferred embodiment of the present invention will be described with reference to the drawings. FIG. 13 is the circuit diagram of a switching power supply according to the fifth preferred embodiment.

As illustrated in FIG. 13, in the switching power supply according to the present preferred embodiment, the transformer T, a circuit pattern on the secondary side of the transformer T, and the isolated transmission element 102 are preferably the same or substantially the same as those in the switching power supply according to the fourth preferred embodiment, and a configuration is included in which the bias winding nb on the primary side is not provided.

In the switching power supply according to the present preferred embodiment, a current transformer circuit 104 preferably includes a primary winding defined by the inductor Lr connected in series to the primary winding np. A resistance element R is connected to the secondary winding of the current transformer circuit 104, and one end portion of the corresponding resistance element R is connected to the anode of the diode D3. In addition, the cathode of the corresponding diode D3 is connected to the switch control digital IC 10, and thus, the monitor signal Vm is supplied to the control digital IC 10.

With such a configuration, it is possible to generate a monitor signal based on the change of a current flowing through the primary winding np of the transformer T. In addition, since such a configuration is used, by supplying the driving voltage Vcc of the control digital IC 10 from the outside, it is possible to perform switching control according to the above-described preferred embodiment even in a configuration in which no bias winding nb is provided. In addition, while, in FIG. 13, a case has been illustrated in which the switching power supply preferably uses the full-wave rectifier circuit based on the center tap method, it is possible to use a configuration, in which the current transformer circuit of the present preferred embodiment is provided, even to a switching power supply based on another method according to each of the above-described preferred embodiments.

Sixth Preferred Embodiment

Figure 14:
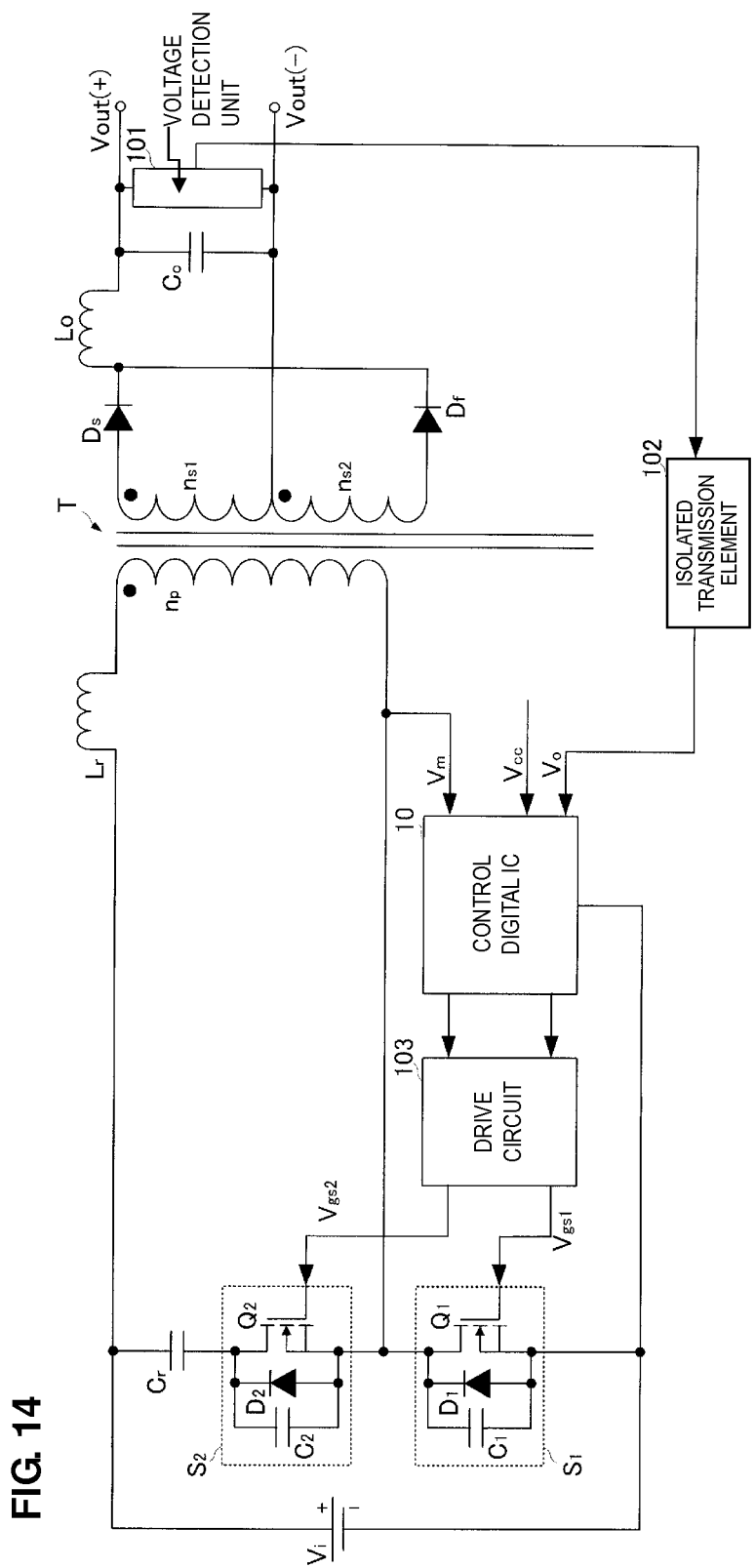
FIG. 14 is a circuit diagram of a switching power supply according to a sixth preferred embodiment of the present invention.

Next, a switching power supply according to a sixth preferred embodiment of the present invention will be described with reference to the drawings. FIG. 14 is the circuit diagram of a switching power supply according to the sixth preferred embodiment.

As illustrated in FIG. 14, in the switching power supply according to the present preferred embodiment, the transformer T, a circuit pattern on the secondary side of the transformer T, and the isolated transmission element 102 are preferably the same as those in the switching power supply including a configuration in which the bias winding nb on the primary side is not provided, as in FIG. 13 in the fifth preferred embodiment.

Furthermore, the switching power supply of the present preferred embodiment preferably does not include the current transformer circuit illustrated in FIG. 13 in the fifth preferred embodiment. Therefore, the switching power supply of the present preferred embodiment preferably obtains the monitor signal Vm from one end portion of the primary winding np through a resistor voltage-dividing circuit, in the same or substantially the same manner as in the first preferred embodiment.

Even in such a configuration, when the driving voltage Vcc of the control digital IC 10 can be supplied from the outside, it is possible to perform switching control according to the above-described preferred embodiment, using no bias winding nb. In addition, while, in FIG. 14, a case has been illustrated in which the switching power supply uses the full-wave rectifier circuit based on the center tap method, it is possible to apply the configuration of the present preferred embodiment even to a switching power supply based on another method according to each of the above-mentioned preferred embodiments.

Seventh Preferred Embodiment

Figure 15:
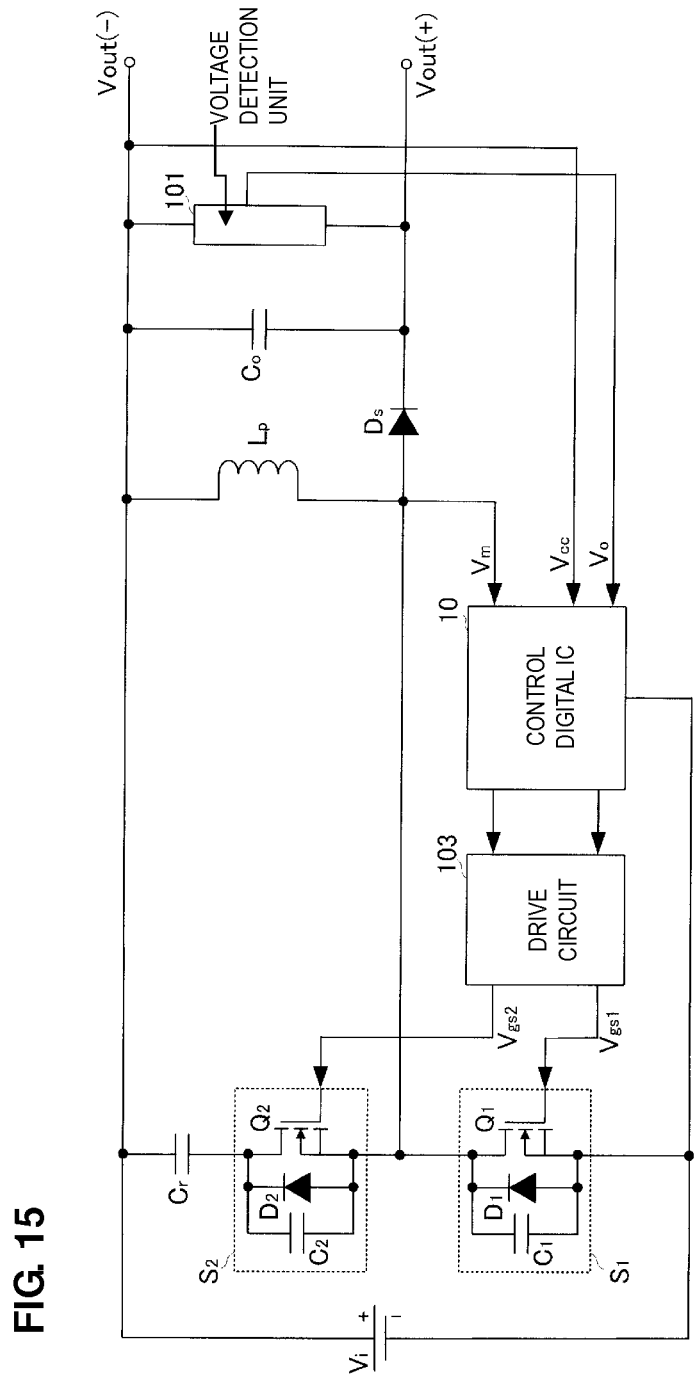
FIG. 15 is a circuit diagram of a switching power supply according to a seventh preferred embodiment of the present invention.

Next, a switching power supply according to a seventh preferred embodiment of the present invention will be described with reference to the drawings. FIG. 15 is the circuit diagram of a switching power supply according to the seventh preferred embodiment.

While, in each of the above-described preferred embodiments, the isolated-type switching power supply including the transformer T has been described as an example, in the present preferred embodiment, a case in which the above-described switching control is applied to an non-isolated-type converter will be described as an example.

The voltage output terminal Vout(−) is connected to one end portion (Vi(+)) of the input power supply Vi, to which the direct-current input voltage is applied. The other end portion (Vi(−)) of the input power supply Vi is connected to the voltage output terminal Vout(+) through a series circuit including the first switch circuit Q1 and the diode Ds.

An inductor Lp is preferably connected on an input power supply Vi side with respect to the diode Ds between both terminals of the voltage output terminals Vout(+) and Vout(−), and furthermore, the capacitor Co is preferably connected on voltage output terminals Vout(+) and Vout(−) sides with respect to the diode Ds. In addition, a series circuit including the capacitor Cr and the second switch circuit S2 is preferably connected in parallel to the inductor Lp on an input power supply Vi side of the inductor Lp.

The first switch circuit S1 includes the first switching element Q1 preferably including a FET, the diode D1, and the capacitor C1. The diode D1 and the capacitor C1 are connected in parallel between the drain and the source of the first switching element Q1, and may be replaced with a parasitic diode and a parasitic capacitance of the first switching element Q1 that is a FET. The first switching element Q1 performs an on-off operation based on the first switching control signal Vgs1 supplied from the control digital IC 10 through the drive circuit 103.

The second switch circuit S2 includes the second switching element Q2 including a FET, the capacitor C2, and the diode D2. The diode D2 and the capacitor C2 are connected in parallel between the drain and the source of the second switching element Q2, and may be replaced with a parasitic diode and a parasitic capacitance of the second switching element Q2 that is a FET. The second switching element Q2 performs an on-off operation based on the second switching control signal Vgs2 supplied from the control digital IC 10 through the drive circuit 103.

In addition, the voltage detection unit 101 including a series resistance circuit and other suitable circuit elements is preferably connected between both terminals of the voltage output terminals Vout(+) and Vout(−). The voltage detection unit 101 generates the detection voltage signal Vo according to an output voltage level between both terminals of the voltage output terminals Vout(+) and Vout(−), and supplies the detection voltage signal Vo to the control digital IC 10.

In addition, the output voltage between the voltage output terminals Vout(+) and Vout(−) is supplied to the control digital IC 10, as the driving voltage Vcc of the control digital IC 10.

As illustrated in the present preferred embodiment, the control digital IC 10 is driven using the driving voltage Vcc, and, based on the monitor signal Vm and the detection voltage signal Vo from the voltage detection unit 101, generates the first switching control signal Vgs1 and the second switching control signal Vgs2 so that the output voltage is controlled so as to be at a predetermined voltage level.

The drive circuit 103 inputs and boosts the first switching control signal Vgs1 and the second switching control signal Vgs2 into signals whose levels can drive at least the second switching element Q2. The drive circuit 103 outputs the first switching control signal Vgs1 to the first switching element Q1 and outputs the second switching control signal Vgs2 to the second switching element Q2.

With such a configuration, it is possible to configure a non-isolated-type buck-boost converter that is called a polarity-reversed chopper circuit and in which the first switching element Q1 of the first switch circuit S1 is used as a control-use switching element and the second switching element Q2 of the second switch circuit S2 and the capacitor Cr are used as a clamp circuit. In addition, even with such a configuration, using the above-described switching control, it is possible to provide a non-isolated-type buck-boost converter having a high degree of reliability and a high degree of efficiency.

In addition, in the same or substantially the same manner as the above-mentioned isolated type switching power supply, even a non-isolated type converter such as the present preferred embodiment may be applied to a structure in which the capacitor Cr connected in series to the second switch circuit S2 are connected in series to the input power supply Vi and the inductor Lp, or a structure in which the series circuit including the second switch circuit S2 and the capacitor Cr are connected in parallel to the first switch circuit S1.

Eighth Preferred Embodiment

Figure 16:
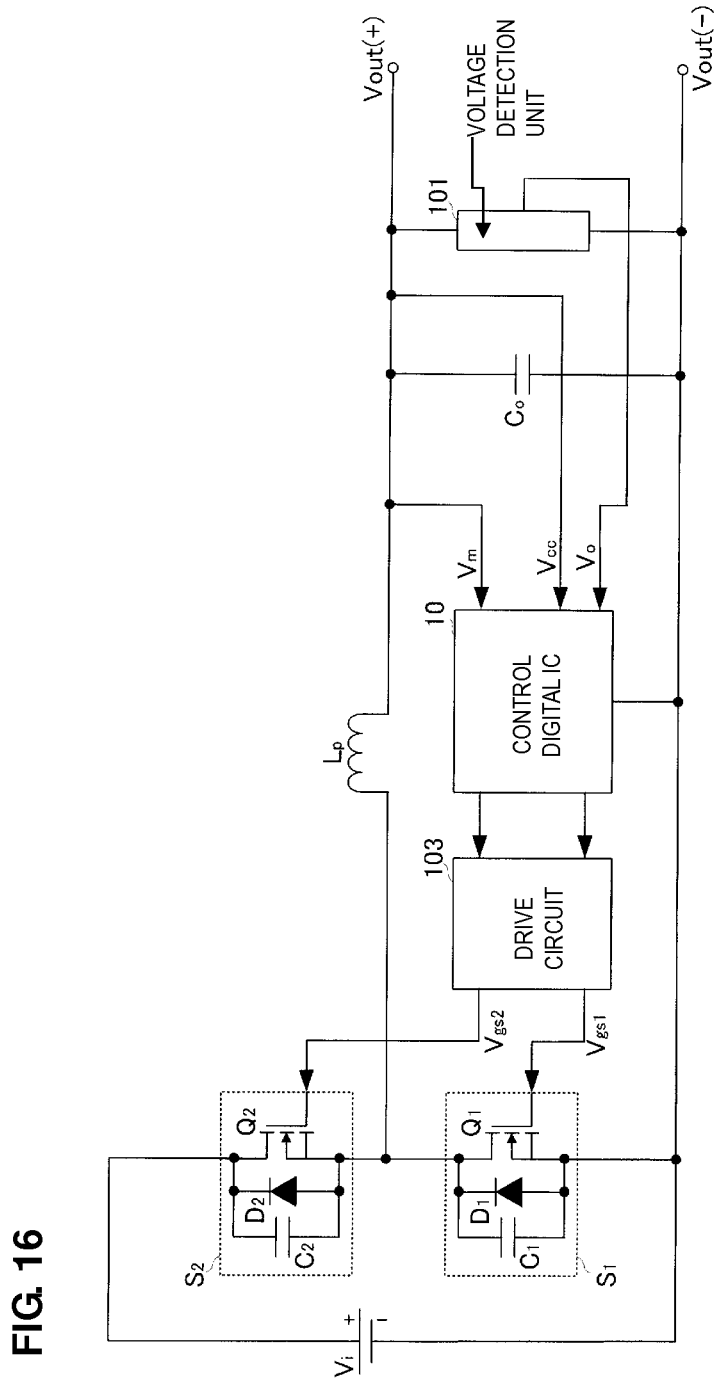
FIG. 16 is a circuit diagram of a switching power supply according to an eighth preferred embodiment of the present invention.

Next, a switching power supply according to an eighth preferred embodiment of the present invention will be described with reference to the drawings. FIG. 16 is the circuit diagram of a switching power supply according to the eighth preferred embodiment.

In the present preferred embodiment, in the same or substantially the same manner as the switching power supply according to the seventh preferred embodiment, a case in which the above-mentioned switching control is applied to a non-isolated-type converter will be described as an example.

Preferably, the voltage output terminal Vout(+) is connected to one end portion (Vi(+)) of the input power supply Vi, to which the direct-current input voltage is applied, through a series circuit including the second switch circuit Q2 and the inductor Lp. On the other hand, the other end portion (Vi(−)) of the input power supply Vi is connected to the voltage output terminal Vout(−).

The second switch circuit S2 preferably includes the second switching element Q2 preferably including a FET, for example, the diode D2, and the capacitor C2. The diode D2 and the capacitor C2 are connected in parallel between the drain and the source of the second switching element Q2, and may be replaced with a parasitic diode and a parasitic capacitance of the second switching element Q2 that is preferably a FET. The second switching element Q2 performs an on-off operation based on the second switching control signal Vgs2 supplied from the control digital IC 10 through the drive circuit 103.

The first switch circuit S1 is connected between a connection point between the second switch circuit S2 and the inductor Lp and the voltage output terminal Vout(−).

The first switch circuit S1 includes the first switching element Q1 preferably including a FET, for example, the diode D1, and the capacitor C1. The diode D1 and the capacitor C1 are connected in parallel between the drain and the source of the first switching element Q1, and may be replaced with a parasitic diode and a parasitic capacitance of the first switching element Q1 that is a FET. The first switching element Q1 performs an on-off operation on the basis of the first switching control signal Vgs1 supplied from the control digital IC 10 through the drive circuit 103.

In addition, the capacitor Co is connected on voltage output terminals Vout(+) and Vout(−) sides with respect to the inductor Lp between both terminals of the voltage output terminals Vout(+) and Vout(−).

In addition, the voltage detection unit 101 including a series resistance circuit and other circuit elements is connected between both terminals of the voltage output terminals Vout(+) and Vout(−). The voltage detection unit 101 generates the detection voltage signal Vo according to an output voltage level between both terminals of the voltage output terminals Vout(+) and Vout(−), and outputs the detection voltage signal Vo to the control digital IC 10.

In addition, the output voltage between the voltage output terminals Vout(+) and Vout(−) is supplied to the control digital IC 10, as the driving voltage Vcc of the control digital IC 10.

As illustrated in FIG. 16, the control digital IC 10 is driven using the driving voltage Vcc, and, based on a first monitor signal Vm1, a second monitor signal Vm2, and the detection voltage signal Vo from the voltage detection unit 101, generates the first switching control signal Vgs1 and the second switching control signal Vgs2 so that the output voltage is controlled to become a predetermined voltage level.

The drive circuit 103 inputs and boosts the first switching control signal Vgs1 and the second switching control signal Vgs2 into signals whose levels can drive at least the second switching element Q2. The drive circuit 103 outputs the first switching control signal Vgs1 to the first switching element Q1 and outputs the second switching control signal Vgs2 to the second switching element Q2.

With such a configuration, a half-bridge-type non-isolated buck converter is provided in which the second switching element Q2 of the second switch circuit S2 is used as a control-use switching element and the first switching element Q1 of the first switch circuit S1 is used in place of a diode. In addition, even with such a configuration, using the above-described switching control, it is possible to provide a non-isolated-type buck converter having a high degree of reliability and a high degree of efficiency.

Ninth Preferred Embodiment

Figure 17:
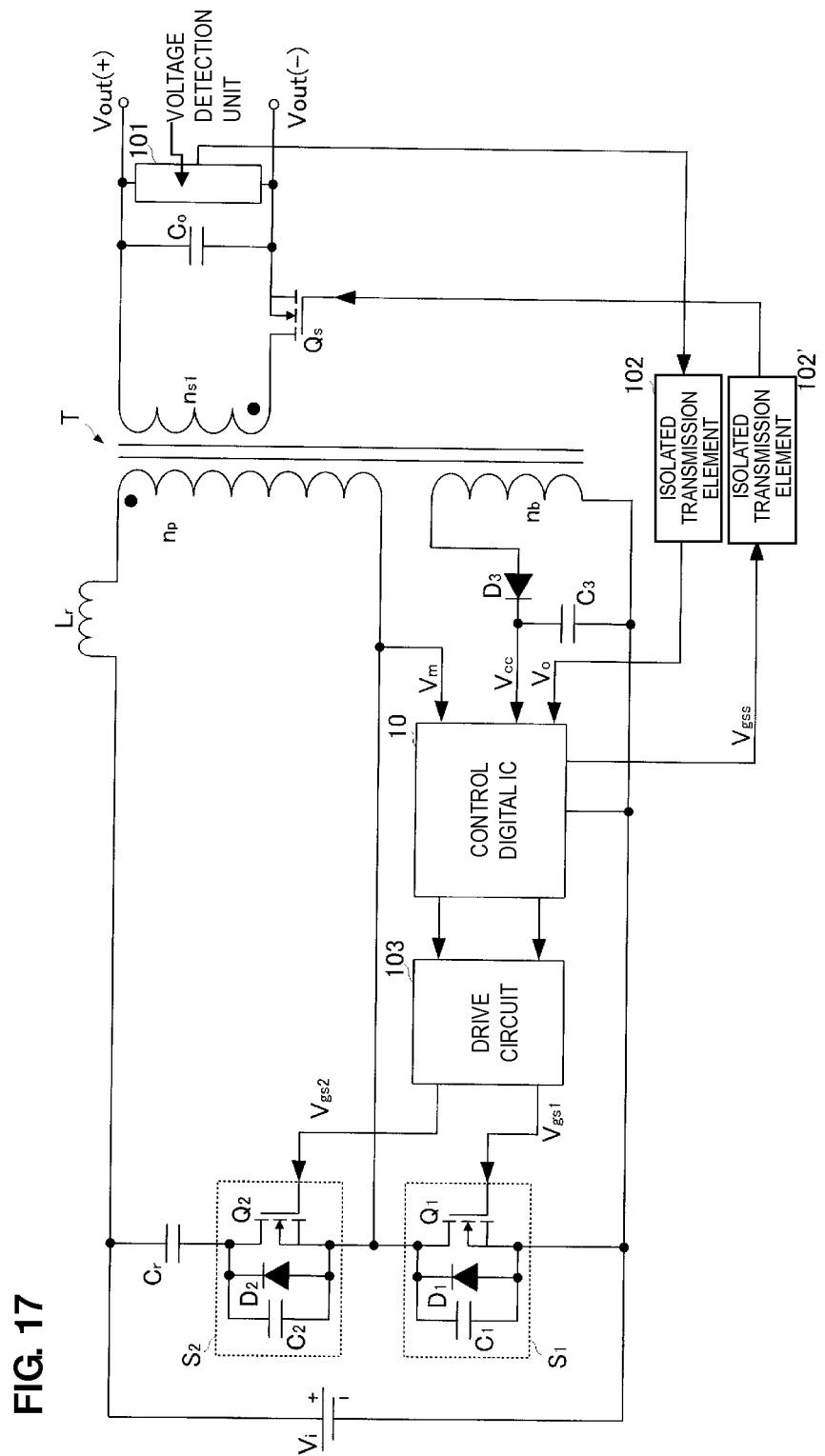
FIG. 17 is a circuit diagram of a switching power supply according to a ninth preferred embodiment of the present invention.

Next, a switching power supply according to a ninth preferred embodiment of the present invention will be described with reference to the drawings. FIG. 17 is the circuit diagram of a switching power supply according to the ninth preferred embodiment.

The switching power supply according to the present preferred embodiment preferably corresponds to a switching power supply in which the diode Ds on the secondary side is replaced with a switching element Qs in the flyback-method switching power supply illustrated in FIG. 1 according to the first preferred embodiment. In such a configuration, the control digital IC 10 also generates a switch control signal Vgss for the switching element Qs in addition to the first switching element Q1 of the first switch circuit S1 and the second switching element Q2 of the second switch circuit S2. At this time, the control digital IC 10 generates the switch control signal Vgss so that the switching element Qs operates in the same or substantially the same manner as the diode Ds illustrated in FIG. 1 according to the first preferred embodiment. In this manner, the switch control signal Vgss generated in the control digital IC 10 is supplied to the switching element Qs through second isolated transmission element 102'. In addition, in the same or substantially the same manner as the first switching control signal Vgs1 and the second switching control signal Vgs2, after being boosted by a drive circuit or other suitable circuit as necessary, the switch control signal Vgss is supplied to the switching element Qs.

Figure 18:
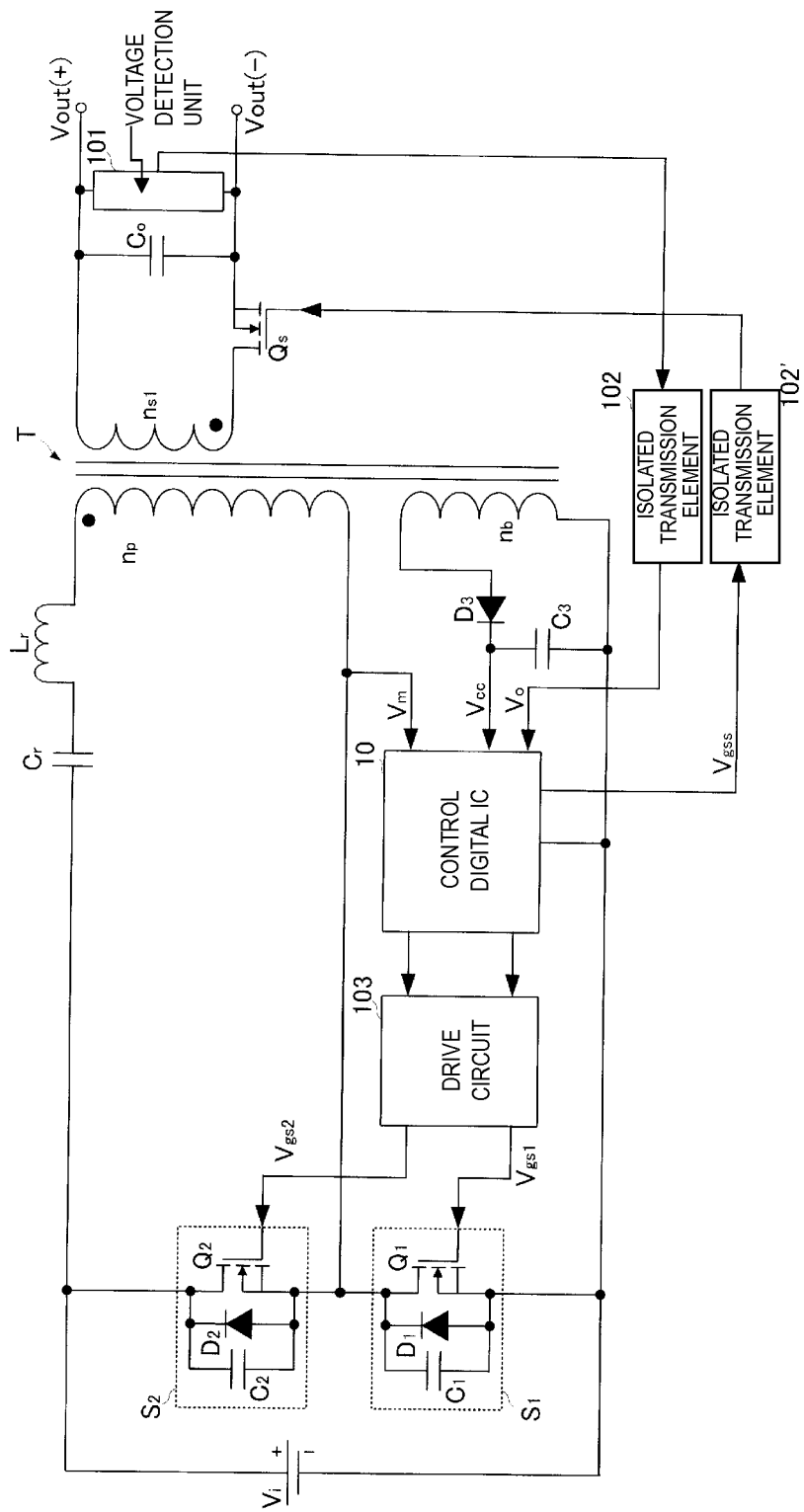
FIG. 18 is a circuit diagram of a switching power supply including another circuit configuration according to the ninth preferred embodiment of the present invention.

In addition, in the present preferred embodiment, in the same or substantially the same manner as the first preferred embodiment, a circuit configuration may also be provided in which the capacitor Cr is connected in series to the input power supply Vi, as illustrated in FIG. 18. FIG. 18 is the circuit diagram of a switching power supply including another circuit configuration according to the ninth preferred embodiment.

Even with these configurations, it is possible to apply the switching control Zn according to the above-described preferred embodiment, and it is possible to obtain the same or substantially the same functional effect.

Tenth Preferred Embodiment

Figure 19:
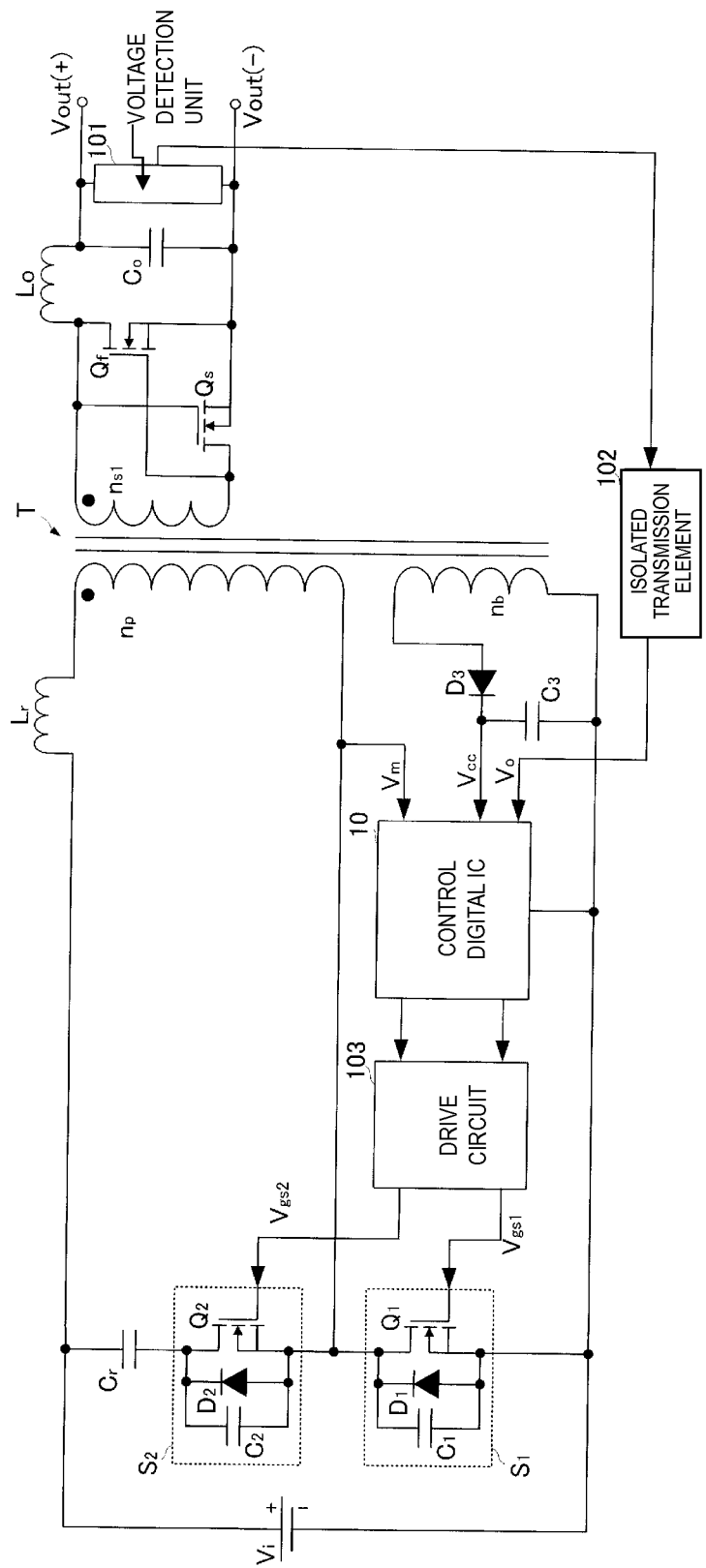
FIG. 19 is a circuit diagram of a switching power supply according to a tenth preferred embodiment of the present invention.

Next, a switching power supply according to a tenth preferred embodiment of the present invention will be described with reference to the drawings. FIG. 19 is the circuit diagram of a switching power supply according to the tenth preferred embodiment.

The switching power supply according to the present preferred embodiment preferably corresponds to a switching power supply in which the diode Ds on the secondary side is replaced with a switching element Qs and the diode Df is replaced with a switching element Qf in the forward-method switching power supply illustrated in FIG. 6 according to the second preferred embodiment. In such a configuration, the switching element Qs corresponding to a rectification-side synchronous rectifying element and the switching element Qf corresponding to a commutation-side synchronous rectifying element preferably define a self-driven synchronous rectifying circuit in which on-off operations are complementarily performed in response to the change of magnetic flux in the secondary winding ns of the transformer T.

Even with these configurations, it is possible to apply the switching control according to the above-mentioned preferred embodiment, and it is possible to obtain the same or substantially the same functional effect.

Eleventh Preferred Embodiment

Figure 20:
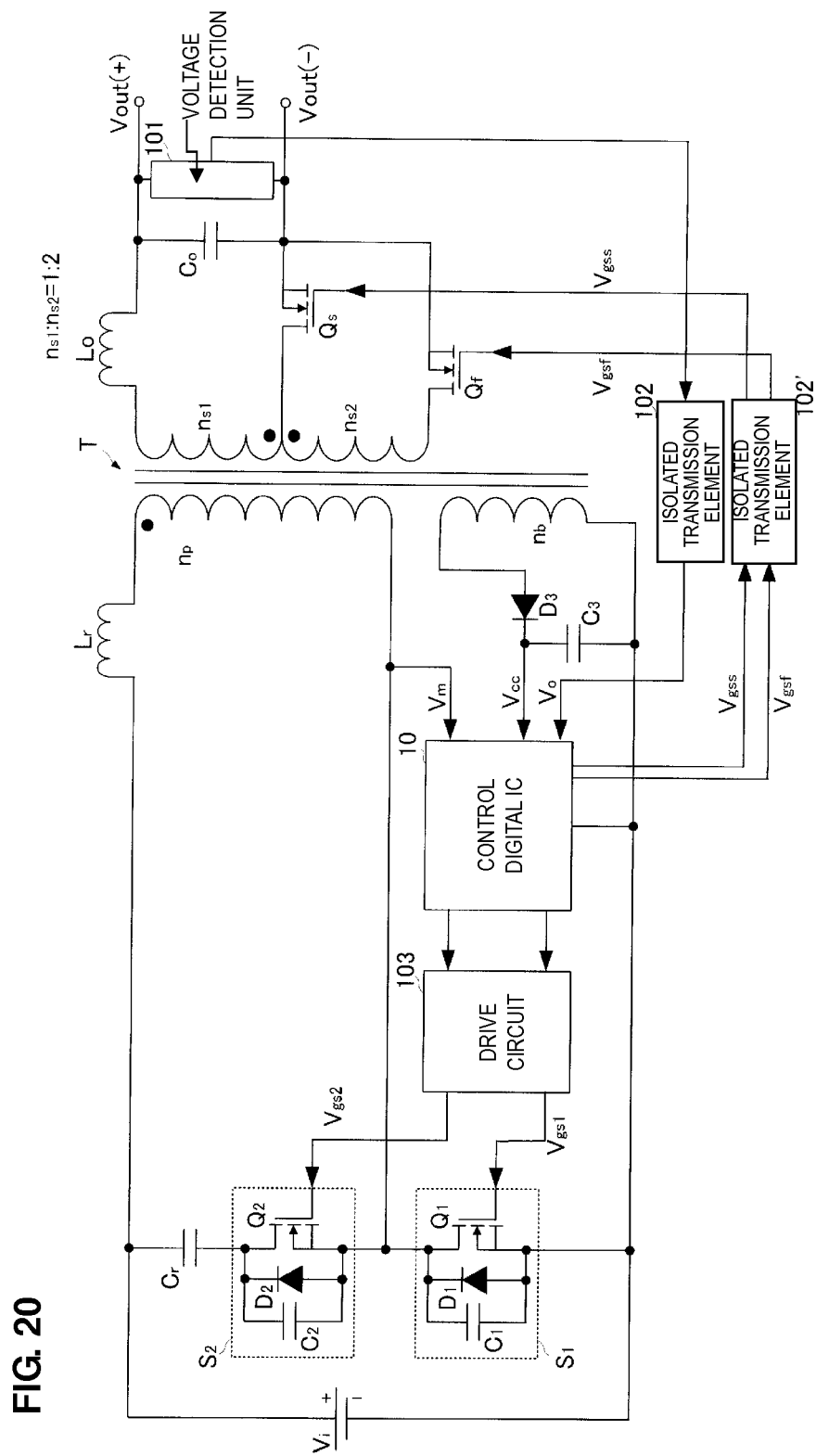
FIG. 20 is a circuit diagram of a switching power supply according to an eleventh preferred embodiment of the present invention.

Next, a switching power supply according to an eleventh preferred embodiment of the present invention will be described with reference to the drawings. FIG. 20 is the circuit diagram of a switching power supply according to the eleventh preferred embodiment.

The switching power supply according to the present preferred embodiment preferably corresponds to a switching power supply in which the diode Ds on the secondary side is replaced with the switching element Qs and the diode Df is replaced with the switching element Qf in the switching power supply illustrated in FIG. 7 according to the third preferred embodiment. With such a configuration, the control digital IC 10 also generates a switch control signal Vgss for the switching element Qs and a switch control signal Vgsf for the switching element Qf in addition to the first switching element Q1 of the first switch circuit S1 and the second switching element Q2 of the second switch circuit S2. At this time, the control digital IC 10 generates the switch control signal Vgss so that the switching element Qs operates in the same or substantially the same manner as the diode Ds in the first preferred embodiment. In addition, the control digital IC 10 generates the switch control signal Vgsf so that the switching element Qf operates in the same or substantially the same manner as the diode Df in the first preferred embodiment. In this manner, the switch control signals Vgss and Vgsf generated in the control digital IC 10 are supplied to the switching elements Qs and Qf through the second isolated transmission element 102'. In addition, in the same or substantially the same manner as the first switching control signal Vgs1 and the second switching control signal Vgs2, after being boosted by a drive circuit or other suitable circuit as necessary, the switch control signals Vgss and Vgsf are supplied to the switching elements Qs and Qf.

Figure 21:
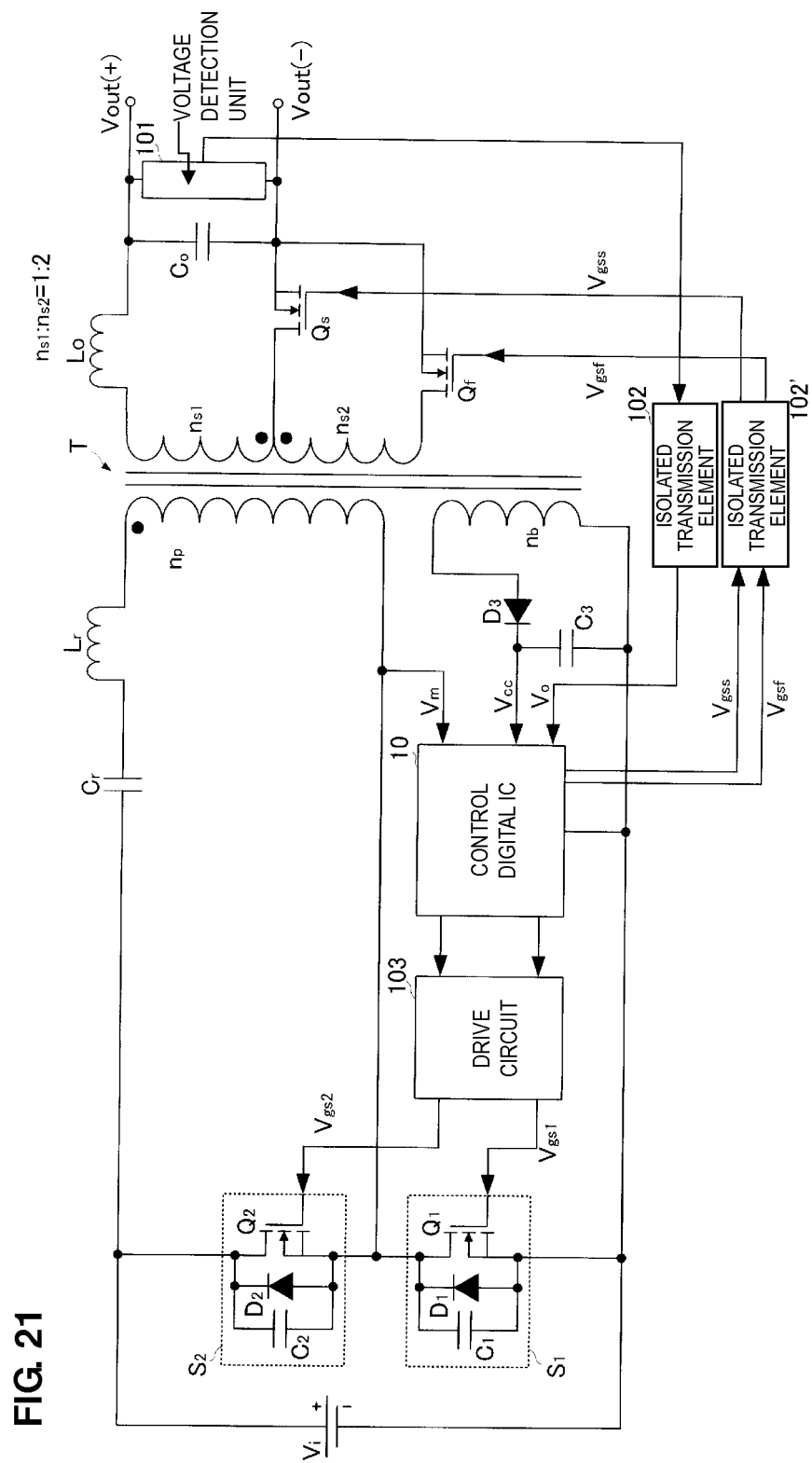
FIG. 21 is a circuit diagram of a switching power supply including another circuit configuration according to the eleventh preferred embodiment of the present invention.

In addition, in the present preferred embodiment, in the same or substantially the same manner as the third preferred embodiment, a circuit configuration may also be provided in which the capacitor Cr is preferably connected in series to the input power supply Vi, as illustrated in FIG. 21. FIG. 21 is the circuit diagram of a switching power supply including another circuit configuration according to the eleventh preferred embodiment.

Even with these configurations, it is possible to apply the switching control according to the above-mentioned preferred embodiment, and it is possible to obtain the same or substantially the same functional effect.

Twelfth Preferred Embodiment

Figure 22:
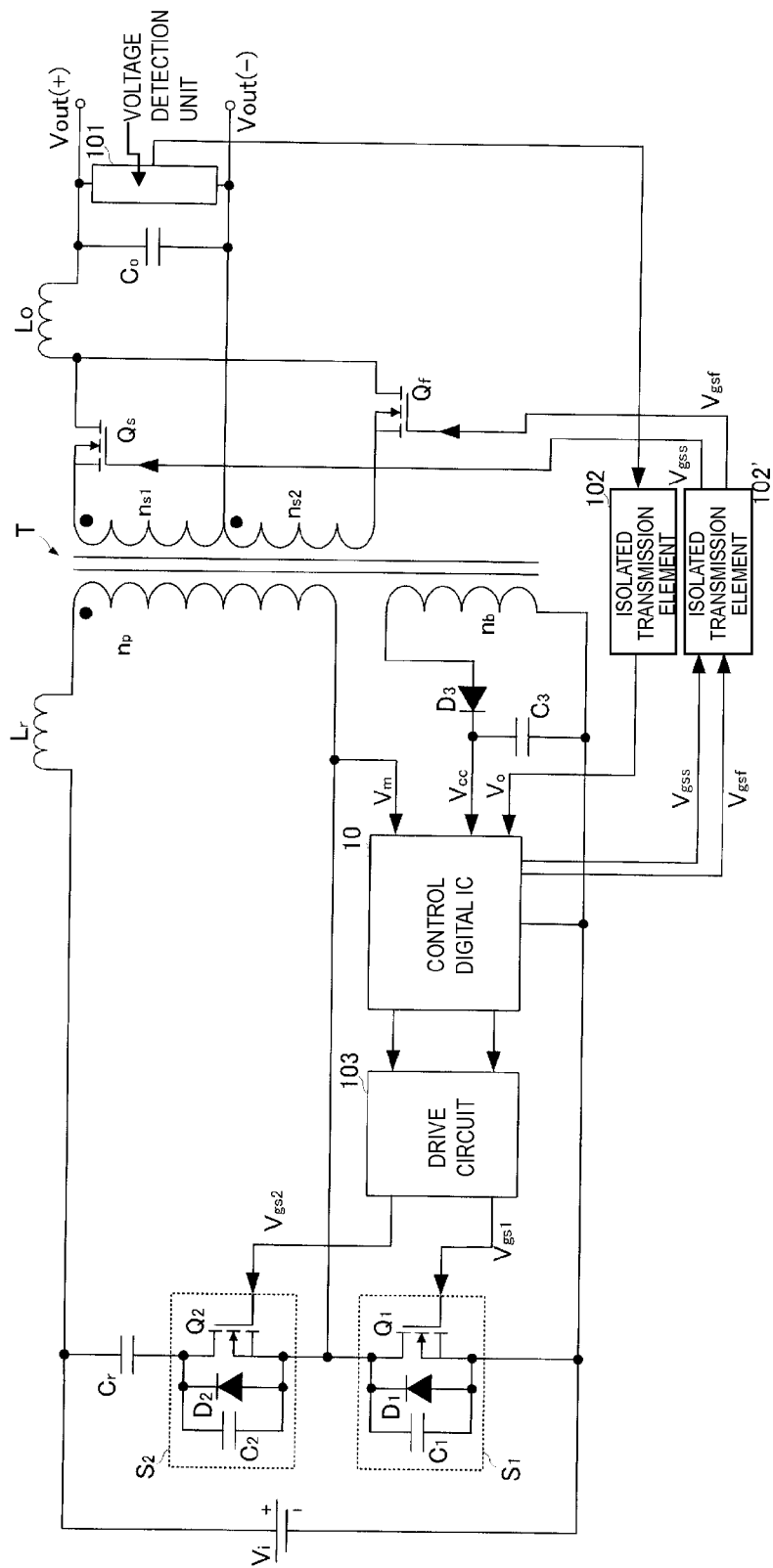
FIG. 22 is a circuit diagram of a switching power supply according to a twelfth preferred embodiment of the present invention.

Next, a switching power supply according to a twelfth preferred embodiment of the present invention will be described with reference to the drawings. FIG. 22 is the circuit diagram of a switching power supply according to the twelfth preferred embodiment.

The switching power supply according to the present preferred embodiment preferably corresponds to a switching power supply in which the diode Ds on the secondary side is replaced with the switching element Qs and the diode Df is replaced with the switching element Qf in the switching power supply including the center tap-type full-wave rectifier circuit, illustrated in FIG. 10 according to the fourth preferred embodiment. With such a configuration, the control digital IC 10 also generates the switch control signal Vgss for the switching element Qs and the switch control signal Vgsf for the switching element Qf in addition to the first switching element Q1 of the first switch circuit S1 and the second switching element Q2 of the second switch circuit S2. At this time, the control digital IC 10 generates the switch control signal Vgss so that the switching element Qs operates in the same or substantially the same manner as the diode Ds according to the first preferred embodiment. In addition, the control digital IC 10 generates the switch control signal Vgsf so that the switching element Qf operates in the same or substantially the same way as the diode Df according to the first preferred embodiment. In this manner, the switch control signals Vgss and Vgsf generated in the control digital IC 10 are supplied to the switching elements Qs and Qf through the second isolated transmission element 102'. In addition, in the same or substantially the same manner as the first switching control signal Vgs1 and the second switching control signal Vgs2, after being boosted by a drive circuit or other suitable circuit as necessary, the switch control signals Vgss and Vgsf are supplied to the switching elements Qs and Qf.

Figure 23:
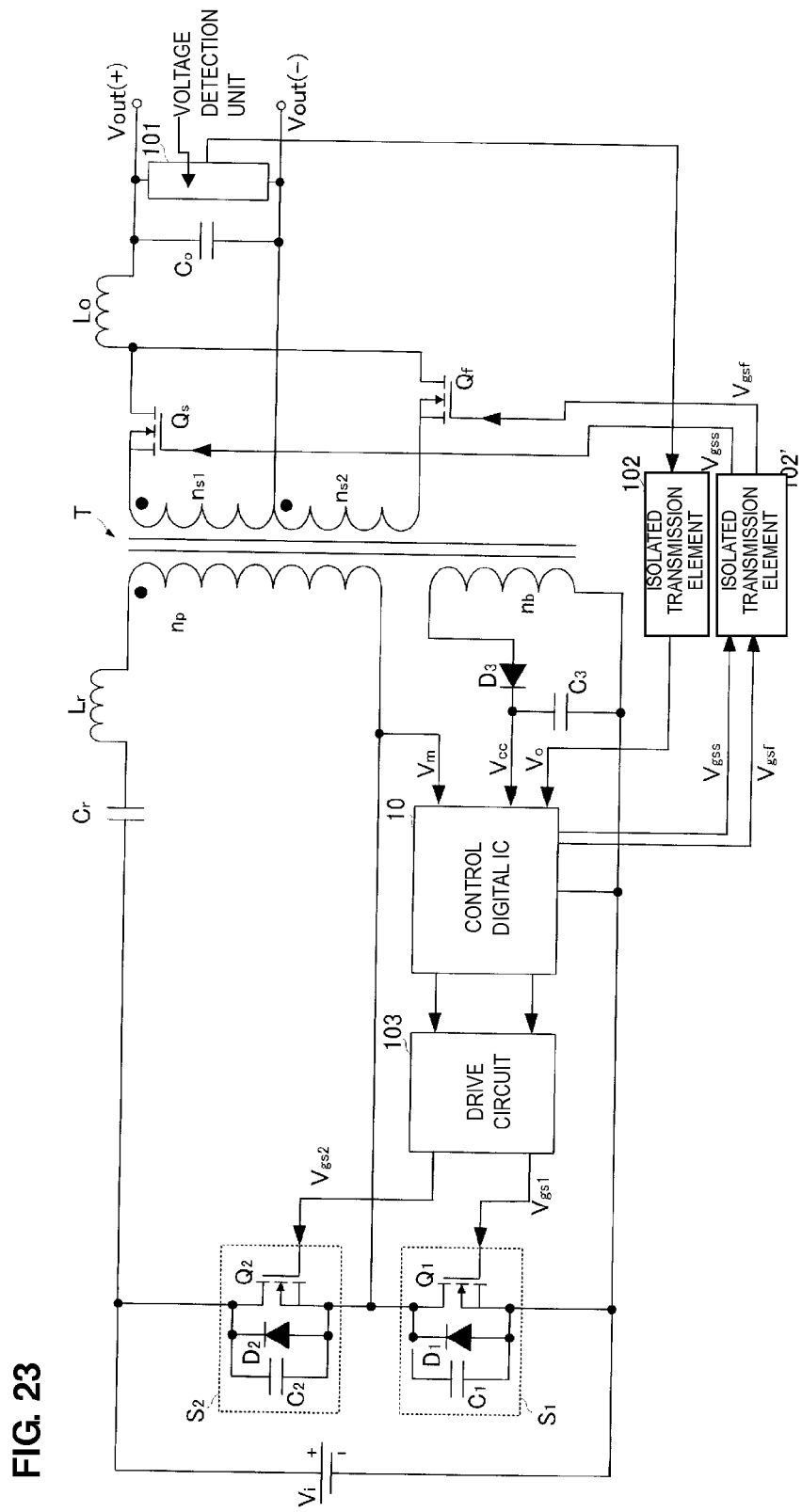
FIG. 23 is a circuit diagram of a switching power supply including another circuit configuration according to the twelfth preferred embodiment of the present invention.

In addition, in the present preferred embodiment, in the same or substantially the same manner as the fourth preferred embodiment, a circuit configuration may also be provided in which the capacitor Cr is connected in series to the input power supply Vi, as illustrated in FIG. 23. FIG. 23 is the circuit diagram of a switching power supply including another circuit configuration according to the twelfth preferred embodiment.

Even with these configurations, it is possible to apply the switching control according to the above-described preferred embodiment, and it is possible to obtain the same or substantially the same functional effect.

Thirteenth Preferred Embodiment

Figure 24:
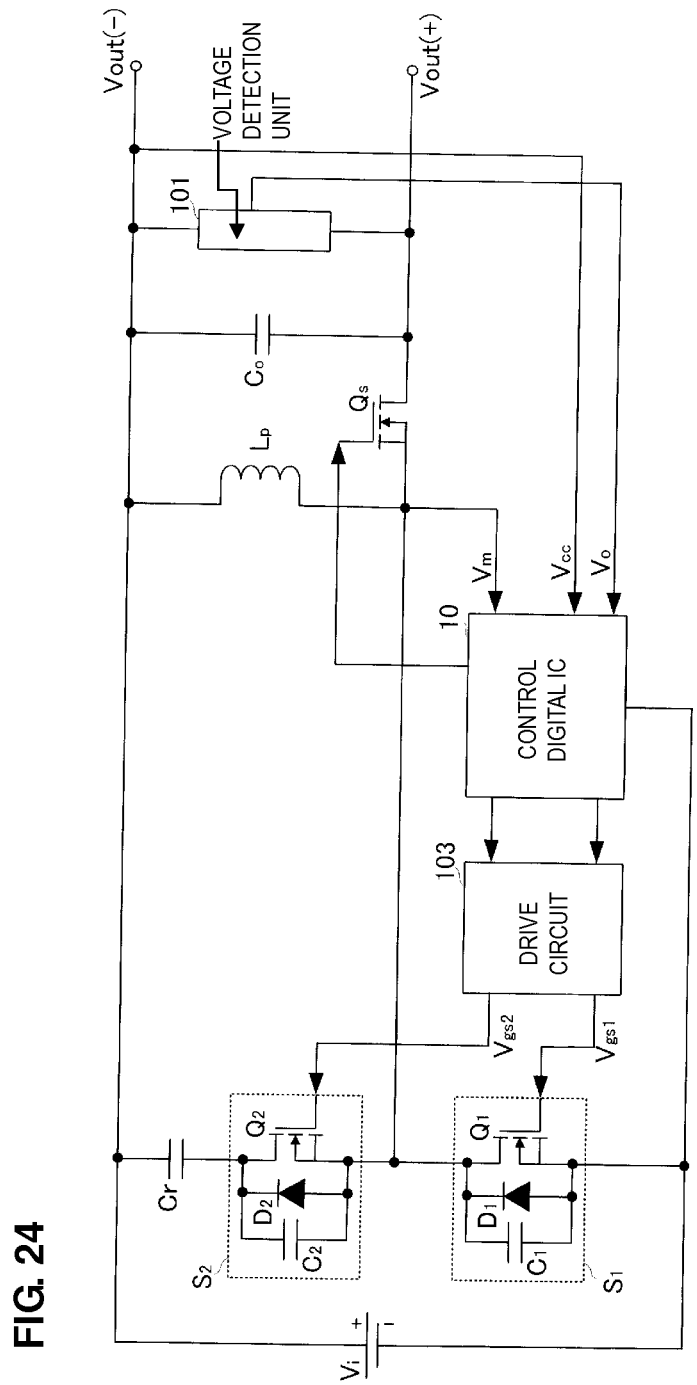
FIG. 24 is a circuit diagram of a switching power supply according to a thirteenth preferred embodiment of the present invention.

Next, a switching power supply according to a thirteenth preferred embodiment of the present invention will be described with reference to the drawings. FIG. 24 is the circuit diagram of a switching power supply according to the thirteenth preferred embodiment.

The switching power supply according to the present preferred embodiment preferably corresponds to a switching power supply in which the diode Ds on the primary side is replaced with the switching element Qs in the non-isolated-type buck-boost converter illustrated in FIG. 15 according to the seventh preferred embodiment.

With such a configuration, the control digital IC 10 also generates the switch control signal Vgss for the switching element Qs in addition to the first switching element Q1 of the first switch circuit S1 and the second switching element Q2 of the second switch circuit S2. At this time, the control digital IC 10 generates the switch control signal Vgss so that the switching element Qs operates in the same or substantially the same manner as the diode Ds according to the seventh preferred embodiment. In this manner, the switch control signal Vgss generated in the control digital IC 10 is supplied to the switching element Qs. In addition, in the same or substantially the same manner as the first switching control signal Vgs1 and the second switching control signal Vgs2, after being boosted by a drive circuit or other suitable circuit as necessary, the switch control signal Vgss is supplied to the switching element Qs.

Even with such a configuration, it is possible to apply the switching control according to the above-mentioned preferred embodiment, and it is possible to obtain the same or substantially the same functional effect.

In addition, the above-described preferred embodiments of the present invention illustrate representative circuit examples to which the switching control of according to a preferred embodiment of the present invention is applicable, and it should be understood that a switching power supply including a circuit that can be easily analogized from the combination of the preferred embodiments can also achieve such a functional effect as described above.

In addition, while, in the above-described preferred embodiments, examples have been illustrated using the monitor signal based on the change of the voltage between the drain and source of the switching element, a Hall sensor may also be provided in the transmission line connecting the switching element Q1 and the switching element side of the primary winding np to each other, and an output from the corresponding Hall sensor may also be provided as a monitor signal, for example, in the primary side circuit of the first preferred embodiment. Accordingly, it is also possible to generate a monitor signal based on the change of a current flowing through the switching element.

In addition, while, in each of the above-described preferred embodiments, an example has been provided in which preferably two threshold values used for the first switching control signal Vgs1 and the second switching control signal Vgs2 are set with respect to one monitor signal, a monitor signal may also be set with respect to each switching control signal and a threshold value may also be set for each monitor signal. At this time, in an arrangement in which a bias winding is provided, an output from the bias winding may also be used as a monitor signal.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A switching power supply apparatus comprising:
a direct current power-supply input unit to which a direct-current input voltage is input;
a transformer defined by one magnetic component and including at least a first primary winding and a first secondary winding that are magnetically coupled to one another;
an inductor connected in series to the first primary winding;
a first switch circuit including a parallel circuit including a first switching element, a first capacitor, and a first diode;
a second switch circuit including a parallel circuit including a second switching element, a second capacitor, and a second diode;
a third capacitor;
a first series circuit connected to both end portions of the direct-current power-supply input unit and in which the first primary winding and the first switch circuit are connected in series; and
a second series circuit connected to both end portions of the first switch circuit or both end portions of the first primary winding and in which the second switch circuit and the third capacitor are connected in series; wherein
the first switch circuit and the second switch circuit are arranged so as to operate so that the first switch circuit and the second switch circuit complementarily repeat turn on and turn off with a time period in between, in which both of the first switch circuit and the second switch circuit are turned off; and
the switching power supply apparatus includes a power converter circuit arranged so that an output voltage is output to a secondary side through a first rectification smoothing circuit arranged to rectify and smooth an alternating-current voltage output from the first secondary winding;
the switching power supply apparatus further comprising:
a first monitor signal generator arranged to detect a change of a voltage or current based on a change of an equivalent circuit of the power converter circuit, which occurs due to the turn off of one of the first and second switch circuits in an on-state, and to generate a monitor signal; and
a digital control circuit arranged to control the first switching element and the second switching element; wherein the digital control circuit sets on-times of the first switching element and the second switching element with a timing based on a clock signal, using arithmetic processing;
start timings of the on-times are determined with a timing based on the clock signal, at which the monitor signal is input as a trigger, and based on the trigger, a control signal provided to turn on one of the first switching element and the second switching element is generated;
a stop timing of the on-time is determined with a timing based on the clock signal in accordance with the on-time set by the arithmetic processing, and based on the stop timing, a control signal provided to turn off the first switching element or the second switching element is generated;
the first switch circuit or the second switch circuit is driven by a zero voltage switching operation in which, after voltages of both end portions of the first switch circuit or the second switch circuit have been decreased to 0 V or approximately 0 V, the one of the first and second switching elements is turned on; and
the digital control circuit generates a first switching control signal or a second switching control signal while maintaining a constant switching period.

2. The switching power supply apparatus according to claim 1, wherein
the switching power supply apparatus includes an output voltage detector arranged to detect the output voltage; and
the on-time of one of the first switching element and the second switching element is determined based on a value detected by the output voltage detector.

3. The switching power supply apparatus according to claim 2, wherein
the on-time of the other of the first switching element and the second switching element is determined by subtracting the on-time of the one of the first switching element and the second switching element from a settable switching period.

4. The switching power supply apparatus according to claim 1, wherein
a magnetic polarity of the first primary winding and the first secondary winding is a reverse polarity with respect to a direction of a current flowing when the first switch circuit is in a conduction state or the second switch circuit is in a conduction state.

5. The switching power supply apparatus according to claim 1, wherein
a magnetic polarity of the first primary winding and the first secondary winding is a same polarity with respect to a direction of a current flowing when the first switch circuit is in a conduction state or the second switch circuit is in a conduction state.

6. The switching power supply apparatus according to claim 1, wherein
the transformer includes a second secondary winding;
the first secondary winding and the second secondary winding are connected in series; and
a turn ratio between the first secondary winding and the second secondary winding is about 1:2.

7. A switching power supply apparatus comprising:
a direct-current power-supply input unit to which a direct-current input voltage is input;
an inductor defined by one magnetic component;
a first switch circuit including a parallel circuit including a first switching element, a first capacitor, and a first diode;

a second switch circuit including a parallel circuit including a second switching element, a second capacitor, and a second diode;
a third capacitor;
a first series circuit connected to both end portions of the direct-current power-supply input unit and in which the inductor and the first switch circuit are connected in series; and
a second series circuit connected to both end portions of the first switch circuit or both end portions of the inductor and in which the second switch circuit and the third capacitor are connected in series; wherein
the first switch circuit and the second switch circuit are arranged to operate so that the first switch circuit and the second switch circuit complementarily repeat turn on and turn off with a time period in between, in which both the first switch circuit and the second switch circuit are turned off; and
the switching power supply apparatus is arranged such that an output voltage is output through a first rectification smoothing circuit including a rectifying element whose anode is connected to a connection point between the inductor and the first switch circuit and a fourth capacitor including one end portion that is connected to a cathode of the rectifying element and that is connected in parallel to the inductor,
the switching power supply apparatus further comprising:
a first monitor signal generator arranged to detect a change of a voltage or current based on a change of an equivalent circuit of the power converter circuit, which occurs due to the turn off of one of the first and second switch circuits in an on-state, and to generate a monitor signal; and
a digital control circuit arranged to control the first switching element and the second switching element; wherein
the digital control circuit sets on-times of the first switching element and the second switching element with a timing based on a clock signal, using arithmetic processing,
start timings of the on-times are determined with a timing based on the clock signal, at which the monitor signal is input as a trigger, and based on the trigger, a control signal used to turn on one of the first switching element and the second switching element is generated;
a stop timing of the on-time is determined with a timing based on the clock signal in accordance with the on-time set by the arithmetic processing, and based on the stop timing, a control signal used to turning off the first switching element or the second switching element is generated;
the first switch circuit or the second switch circuit is driven by a zero voltage switching operation in which, after voltages of both end portions of the first switch circuit or the second switch circuit have been decreased to 0 V or approximately 0 V, the one of the first and second switching elements is turned on; and
the digital control circuit generates a first switching control signal or a second switching control signal while maintaining a constant switching period.

8. The switching power supply apparatus according to claim 1, wherein
the rectifying element of the first rectification smoothing circuit is a field-effect transistor.

9. The switching power supply apparatus according to claim 8, wherein
the rectifying element of the first rectification smoothing circuit is subjected to on-off control by the digital control circuit.

10. A switching power supply apparatus comprising:
a direct-current power-supply input unit to which a direct-current input voltage is input;
an inductor defined by one magnetic component;
a first switch circuit including a parallel circuit including a first switching element, a first capacitor, and a first diode; and
a second switch circuit including a parallel circuit including a second switching element, a second capacitor, and a second diode; wherein
a series circuit including the first switch circuit and the second switch circuit is connected to both end portions of the direct-current power-supply input unit;
the switching power supply apparatus is arranged such that one end portion of the inductor is connected to a connection point between the first switch circuit and the second switch circuit and, from the other end portion thereof, an output voltage is output through a third capacitor connected in parallel to the first switch circuit; and
the first switch circuit and the second switch circuit are arranged to operate such that the first switch circuit and the second switch circuit complementarily repeat turn on and turn off with a time period in between, in which both of the first switch circuit and the second switch circuit are turned off;
the switching power supply apparatus further comprising:
a first monitor signal generator arranged to detect a change of a voltage or current based on an equivalent circuit of the power converter circuit, which occurs due to the turn off one of the first and second switch circuits in an on-state, and to generate a monitor signal; and
a digital control circuit arranged to control the first switching element and the second switching element; wherein
the digital control circuit sets on-times of the first switching element and the second switching element with a timing based on a clock signal, using arithmetic processing;
start timings of the on-times are determined with a timing based on the clock signal, at which the monitor signal is input as a trigger, and based on the trigger, a control signal used to turn on one of the first switching element and the second switching element is generated;
a stop timing of the on-time is determined with a timing based on the clock signal in accordance with the on-time set by the arithmetic processing, and based on the stop timing, a control signal used to turn off the first switching element or the second switching element is generated;
the first switch circuit or the second switch circuit is driven by a zero voltage switching operation in which, after voltages of both end portions of the first switch circuit or the second switch circuit have been decreased to 0 V or approximately 0 V, the one of the first and second switching elements is turned on; and
the digital control circuit generates a first switching control signal or a second switching control signal while maintaining a constant switching period.

11. The switching power supply apparatus according to claim 7, wherein
the switching power supply apparatus includes a output voltage detector arranged to detect the output voltage; and the on-time of one of the first switching element and the second switching element is determined based on a value detected by the output voltage detector.

12. The switching power supply apparatus according to claim 11, wherein
the on-time of the other of the first switching element and the second switching element is determined by subtracting the on-time of the one of the first switching element and the second switching element from a settable switching period.

13. The switching power supply apparatus according to claim 1, wherein
at least one of the first switch circuit or the second switch circuit is a field-effect transistor.

14. The switching power supply apparatus according to claim 1, wherein
the first monitor signal generator utilizes a change of a drain-to-source voltage of at least one of the first switching element and the second switching element.

15. The switching power supply apparatus according to claim 1, wherein
the first monitor signal generator utilizes a change of a drain-to-source current of at least one of the first switching element and the second switching element.

16. The switching power supply apparatus according to claim 10, wherein
the first monitor signal generator utilizes a change of a voltage occurring between both end portions of the second primary winding.

17. The switching power supply apparatus according to claim 1, wherein
the digital control circuit is a DSP.

18. The switching power supply apparatus according to claim 1, wherein
the digital control circuit is an FPGA.

* * * * *